(12) United States Patent
Gao et al.

(10) Patent No.: US 10,382,288 B2
(45) Date of Patent: Aug. 13, 2019

(54) DATA VIEW SYSTEM FOR COMPUTER NETWORK MANAGEMENT

(71) Applicant: NetBrain Technologies, Inc., Burlington, MA (US)

(72) Inventors: Lingping Gao, Lexington, MA (US); Guangdong Liao, Concord, MA (US); Yujie Wang, Bedford, MA (US); Feng Gan, Billerica, MA (US)

(73) Assignee: NetBrain Technologies, Inc., Burlington, MA (US)

( * ) Notice: Subject to any disclaimer, the term of this patent is extended or adjusted under 35 U.S.C. 154(b) by 350 days.

(21) Appl. No.: 15/287,230

(22) Filed: Oct. 6, 2016

(65) Prior Publication Data
US 2018/0018065 A1    Jan. 18, 2018

Related U.S. Application Data

(60) Provisional application No. 62/338,919, filed on May 19, 2016.

(51) Int. Cl.
*H04L 12/24* (2006.01)
*G06T 11/20* (2006.01)

(52) U.S. Cl.
CPC ............ *H04L 41/22* (2013.01); *G06T 11/206* (2013.01); *G06T 2200/24* (2013.01); *H04L 41/12* (2013.01)

(58) Field of Classification Search
CPC ...................................... G06F 3/048
See application file for complete search history.

(56) References Cited

U.S. PATENT DOCUMENTS

| 8,386,593 B1* | 2/2013 | Gao ..................... H04L 41/085 709/223 |
| 2007/0204231 A1* | 8/2007 | Cunningham .......... H04L 41/12 715/734 |

* cited by examiner

*Primary Examiner* — Pei Yong Weng
(74) *Attorney, Agent, or Firm* — Brinks Gilson & Lione

(57) ABSTRACT

A GUI system for accessing and displaying computer network data dynamically. Network data regarding network devices and interfaces are typed into different categories. Each Data Unit type is represented with a specific graphic element for data display and data accessing.

20 Claims, 23 Drawing Sheets

DATA VIEW SYSTEM FOR COMPUTER NETWORK MANAGEMENT

CROSS-REFERENCE

Priority is claimed from U.S. Provisional Patent Application No. 62/338,919 entitled "Data View System For Network Management," filed on May 19, 2016, the entirety of which is hereby incorporated by reference.

BACKGROUND

The present application relates to computer network data management, and more particularly to a visual graphic system and method for efficient computer network data accessing and management with a network map.

Note that the points discussed below may reflect the hindsight gained from the disclosed inventions, and are not necessarily admitted to be prior art.

In recent decades, computer network systems have become very complex. There are many interwoven levels of network connections, such as Local Area Networks (LAN), Personal Area Networks (PAN), Home Area Networks (HAN), Wide Area Networks (WAN), Metropolitan Area Networks (MAN), Enterprise Private Networks, Internetworks, Backbone Networks (BBN), Global Area Networks (GAN), the Internet, and the Wireless networks of smart phones and tablet devices (G3 and G4, for example), to name a few. Device data expansion is exponential and continues to be. The tasks for efficiently accessing and managing network data remain to be highly challenging.

Moreover, a computer network is always in a state of dynamic changing. In other words, by their nature, computer networks are not static; rather, they are continually being changed, reconfigured and upgraded. To efficiently manage vast and dynamic computer networks, one must be able to provide an accurate "snapshot" representation of the network and its data at any given point of time.

Inspired by the concepts of zoomable geographic mapping and multi-layers of representation of granularity, NetBrain Technologies Company in Massachusetts has developed a unique Qmap computer network management system for managing network changes. Fully GUI based, Qmap network management system enables network engineers to manage network devices and systems similar to a geographic map system.

As set forth in U.S. Pat. No. 8,386,593 B1 to Gao et al, and U.S. Pat. No. 8,386,937 B1 to Gao et al, and the entirety of these publications are thus incorporated by reference, the Qmap network management system organizes network devices into multi-layers of visual graphic representations, linked both by logic and by physical relationships. Network management engineers can not only visually observe a computer network on a computer screen, but also can directly and intuitively interact with the network to the smallest detail of a device as well as to the highest level of grand network design.

With the Qmap system, network engineers can create a network Qmap instantly for a network management task and use that Qmap as the platform for further analysis and troubleshooting. Network engineers can tackle tasks with ease that include network diagramming and documentation, performance troubleshooting, and network design analysis. For example, using Q-maps, the approach to troubleshooting a network problem becomes a three-step automated process: 1) mapping the problem area, 2) probing the live network from the map to obtain current network information, and 3) comparing the current network information with historical information maintained for the network.

Within the Qmap system, network device data accesses have been automated at multiple layers, each layer of data and their representation can be automatically retrieved, stored and analyzed.

However, due to limited on-screen space, current Qmap system has limited capacity to display a large amount of static and dynamic data. In order to allow for dynamic data display and more task-oriented data interactions, NetBrain Technologies thus provides an improved data view system and method that can be easily applied to a network map, particularly a network Qmap, to allow for data display according to different types of actual network management tasks.

SUMMARY

Disclosed is a Data View system to view and access multi-layers of dynamic computer network data in correlation with different network management tasks.

In one embodiment, varieties of network device data are categorized into different Data Units. Besides the data type and value, a Data Unit includes the particular information to define where and how to display the data on a network map, preferably a Qmap. A set of Data Units are organized into a Data View.

In one aspect, a Data Unit includes at least the properties of data unit name, data unit type, time created and time updated, status of locked or unlocked, the position information on the Qmap, logical statement, device or link highlight and corresponding color, device and interface note.

In one embodiment, Data Units are categorized into pre-defined Data Unit Types, including at least String type, Config-let type, CLI-Command type, Table type, Hyperlink type, External Document type, Change Event type, Highlight type, Float, Percentage, and Boolean Expression type.

In one embodiment, positioning information of a Data Unit in graphic network map is specified through a Data View builder GUI.

In one embodiment, a group of Data View instances are created to form a Data View Group by applying a Data View Template to a group of devices in a network map.

In one embodiment, a set of Data View instances are created for a particular combination of Data Units of the selected network devices and are stored for simultaneous data retrieval, and the data source of these Data View instances is either automatically linked with a current Qmap or the original map.

In one aspect of an embodiment, device and interface color and highlight rules are user-defined using Boolean expression.

In one aspect of an embodiment, specific network data or device data are accessed through an auto-linked graphic element in accordance with their Data Unit Types.

In one embodiment, multiple Data View Groups are generated by applying two or more Data View Templates to a group of devices to form a Data View Compound for network task management.

In one embodiment, a Data View manager is provided to directly edit network data on a network map.

In one embodiment, a set of pre-defined Data View Templates are provided in a Data View builder for creating a particular Data View in accordance to a pre-defined data types and variables and network protocols.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

Figure 1:
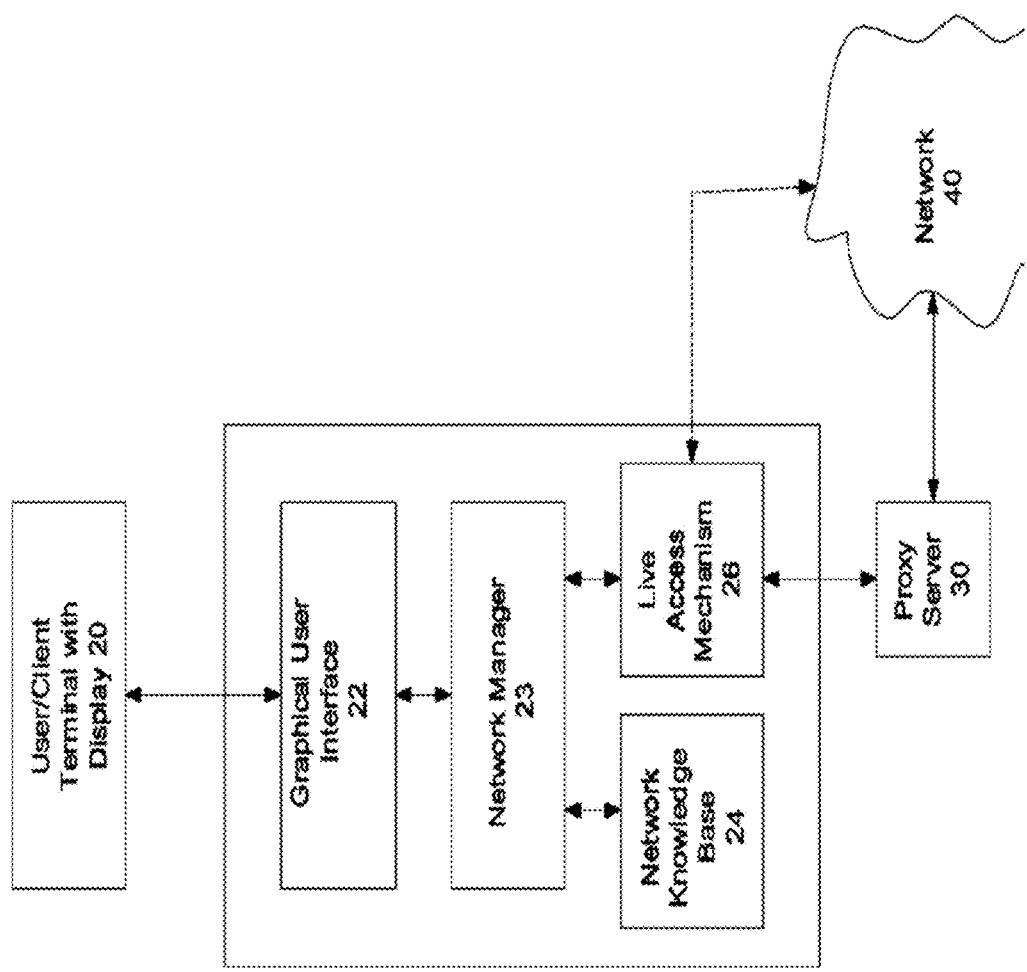
FIG. 1 is a schematic block diagram showing a sample network management system in accordance with this application.

The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and the description and details of well-known features and techniques may be omitted to avoid unnecessarily obscuring the invention. Additionally, elements in the drawing figures are not necessarily drawn to scale—some areas or elements may be expanded to help improve understanding of embodiments of the invention. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The present application may be described herein in terms of functional block components and various processing steps. It should be appreciated that such functional blocks may be realized by any number of hardware and/or software components configured to perform the specified functions. For example, the present invention may employ various integrated circuit components, such as memory elements, processing elements, logic elements, look-up tables, and the like, which may carry out a variety of functions under the control of one or more microprocessors or other control devices.

Similarly, the software elements of the present invention may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. However, many alternative or additional functional relationships or physical connections may be present in a practical incentive system implemented in accordance with the invention.

As will be appreciated by one of ordinary skill in the art, the present invention may be embodied as a method, a data processing system, a device for data processing, and/or a computer program product. Accordingly, aspects of the present invention may take the form of an entirely software embodiment, an entirely hardware embodiment, or combining aspects of both software and hardware embodiment. Furthermore, the present invention may take the font of a computer program product on a computer-readable storage medium having computer-readable program-code means embodied in the storage medium. Any suitable computer-readable storage medium may be utilized, including hard disks, CD-ROM, optical storage devices, magnetic storage devices, and/or the like. These computer program instructions may be loaded onto a general purpose computer, special purpose computer, or other programmable data processing apparatus to produce a machine article, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture, including instruction means, which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As used herein, the terms "user", "network engineer", "network manager", "network developer" and "participant" shall interchangeably refer to any person, entity, organization, machine, hardware, software, or business who accesses and uses the system of this invention. Participants in the system may interact with one another either online or off-line.

Communication between participants in the system of the present invention is accomplished through any suitable communication means, such as, for example, a telephone network, intranet, Internet, extranet, WAN, LAN, personal digital assistant, cellular phone, online communications, off-line communications, wireless network communications, satellite communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The term "graphic" or "visual" or "graphic element" are used interchangeably and refer to the computer element that contains at least one interactive element and can be displayed on a computer screen as an image or drawing associated with an interactive computer executable function, not a simple input prompt. A graphic computer element is generally the available element in any current or future Graphic User Interface (GUI) computer software design, such as a button, a hyperlink, a frame, a browser window, a scrolling bar, a text editor window, etc. In computer technology, graphic user interface is commonly distinguished from CLI input prompt and interface.

A particularly powerful tool for understanding network behavior is through graphic visualization where the complicated interactions between network devices are vividly represented through drawings and graphs. According to one embodiment, a graphical representation of the network using a map may be output to a display screen, printer, plotter, or the like. Background technologies and terminologies are further described in U.S. Pat. No. 8,386,593, the content of which is incorporated by reference.

The term "CLI" refers to command line interface or console user interface and is a means of interacting with a computer program where the user (or client) issues text commands to the program at a command prompt (command lines). A CLI command consists of syntax and semantics. The syntax is the grammar that all commands must follow. Operating systems (OS), MS-DOS and Unix shell each define their own set of rules that all commands must follow. In the case of embedded systems, the manufacturers and vendors, such as Nortel, Juniper Networks or Cisco Systems, define their own proprietary set of rules to which all commands within their CLI must conform. Because of the complexity of computer network systems and many mixtures of different devices of different vendors, the traditional method of network management is through manually issuing commands at the CLI prompt using the syntax and commands from manufacturer's manuals.

The term "Data View" refers to the functionalities that allow users to create their own customized views of network data and display those views on a network map. Users can create multiple Data Views for each device. Each actual Data View has two parts: (1) the data that are selected for display; and (2) the positions of that data within the display. The inventive system also includes pre-defined Data Views that can be modified and saved as new Data Views or as Data View Templates.

The term "Data View Group" refers to any grouping of Data View instances of a group of network devices to which a Data View has been applied to all such devices, so that all devices of the group display the same set of Data Unit Types at their relative positions.

The term "Data View Template" refers to the template that can be used to generate Data Views. Data View Templates can be applied across all devices on a network or on subsets of devices on a network to create Data Views for these devices. Data View Templates can be defined from scratch or created from any existing Data Views or maps.

The term "Data Unit" refers to a unit of data related to a device that at least includes information of its display position on a map. For example the network host name of a device and the display position on a map.

The term "Data Unit Type" refers to the type of a data unit categorized according to its data content, which can be a string such as the software version, a number such as interface bandwidth, a table such as routing table, a chart such as monitoring data, a hyperlink, an external document, a CLI command result or a config-let for a parsed section of a device configuration for a network technology such as BGP. A Data Unit Type is associated with a particular GUI element for data display, monitoring and editing. The types of a network data are also functionally categorized into "String" to use text editors or field inputs for texts of device software version and serial numbers; "Config-let" to use popup widows for the configuration data; a "CLI command" to use popup windows to show results from running a CLI command; a "Table" to use tables for table data such as a routing table; a "Hyperlink" uses hyperlink for linking a $3^{rd}$ party data source; a "DOC" to use proper third party software associated with the file extension of an external file; a "Change Event" to use dynamic settings for attributes that have a timestamp associated change; a "Highlight" to use colors for display; "Chart" to use graphs to monitor changes over time.

The term "Object" refers to the term used in computer technology, in the same meaning of "object oriented" programming languages (such as Java, Common Lisp, Python, C++, Objective-C, Smalltalk, Delphi, Java, Swift, C#, Perl, Ruby, and PHP), specifically, an abstracting computer logic entity that envelopes or mimics an entity in the real physical world. An Object usually possesses an interface, data properties and/or methods.

The term "Device" refers to an Object representing a physical computer machine (e.g. router, switch and firewall) connected in a network or an object (e.g. computer instances or database instances on a server) created by computer logic functioning in a computer network.

The term "Interface" refers to the set of logic objects or methods of a Device that are used to communicate with another Device or data object.

The term "Topology" refers to the connections between Interfaces. For example, L3 topology refers to logic connections between two Interfaces and L2 topology refers to physical connections between two Interfaces.

The term "Qmap" or "Q-map" refers to a patented computer technology created by NetBrain Technologies, Inc that uses visual images and graphic drawings to represent the topology of a computer network with interface property and device property displaying through GUI.

The term "Network Data" refers to any information relating to a device, an interface, a topology or any other related information in a computer network.

In building a network Qmap, map Topology follows the TCP/IP layer structure. The many layers of network communication can include the Network Interface layer, also called Data Link layer, the Internet layer, also called Network layer, the Transportation layer, and the Application layer. The Network Interface layer is responsible for the lowest level of data transmission, facilitating communication with the underlying physical network. The Internet layer provides the mechanism for intersystem communications, controlling message routing, validity checking and composition and decomposition of message headers. For example, IP protocol, and Internet Control Message Protocol, such as Ping, operates at this layer. The Transport layer provides message transport services between applications running on remote systems, TCP or UDP protocol operates at this layer.

Thus different device data and data types are associated with each layer of connection and communication. Device Data include Vendor information, such as Cisco, Juniper and Huawei, Model information, OS (Operating System) version and information, Hostname, IP address, Serial number and Routing Protocols such as OSPF, BGP and ISIS. Interface Data include Name, IP address, Serial number, Routing Protocols, Running Status, Bandwidth, etc., depending on the technologies involved and developed. These data can be discovered via SNMP and CLI commands.

Data View system thus enables network engineers to create different views to efficiently organize these layers of network data according to network management tasks and data relationships.

In a Qmap computer network system, as demonstrated in FIG. 1, a network management system 10 would generally include a network manager 23 that communicates with a user/client terminal 20 via a graphic user interface 22 and a network live access mechanism 26. In a live network 40, networked devices, such as network routers and switches communicate directly or via a proxy server 30. A storage device 24 may be integrated or separately employed to store device status or configuration information. The network data are differentiated into physical and logic-based relationships as to a device. For example, information about its routing protocol, its multicast modes, its Access List (ACL), and the communication interface (IP protocols and addresses, for example) with another device, are represented in a Qmap as shown in FIG. 2. With the ability to zoom for different display resolution and granularity for different data layers, a network engineer can toggle between multiple views according to his/her needs within a single Qmap. The network manager 23 is also enabled to extract device information by appropriate CLI commands or SNMP commands, or by a pre-built executable function within a Qmap.

In particular, a Qmap system may be categorized into both a layer 2 (L2) Qmap and a layer 3 (L3) Qmap, where the L2 Qmaps show the physical connections between the devices and the L3 Qmaps show the logical connections in the network. The logical connections are connections between L3 network devices such as routers, firewalls and VPN devices. For example, all L3 interfaces in the same subnet are connected in L3 Qmaps. By zooming in and out of views, a user will be able to see multiple levels of granularity of the network. Higher zoom level views may show bigger pictures of the network connections at larger scale, such as data centers and their interconnections, while lower zoom level views show more details at device level and their detailed interactions.

In the Data View system, the network data can be organized by using different Data Views that are based on data relationships. A Data View not only defines the set of data to be displayed but also how these data are displayed in a map. Within a Qmap, the user can switch between different types of Data Views to view devices' different types of data. This utility is demonstrated in reference to FIG. 2A and FIG. 2B, which show examples of different Data Views for the same network devices in Qmap 200 that contains devices 201, 203, 205, 207, 209, 211, 213, 215, and 217.

Figure 2A:
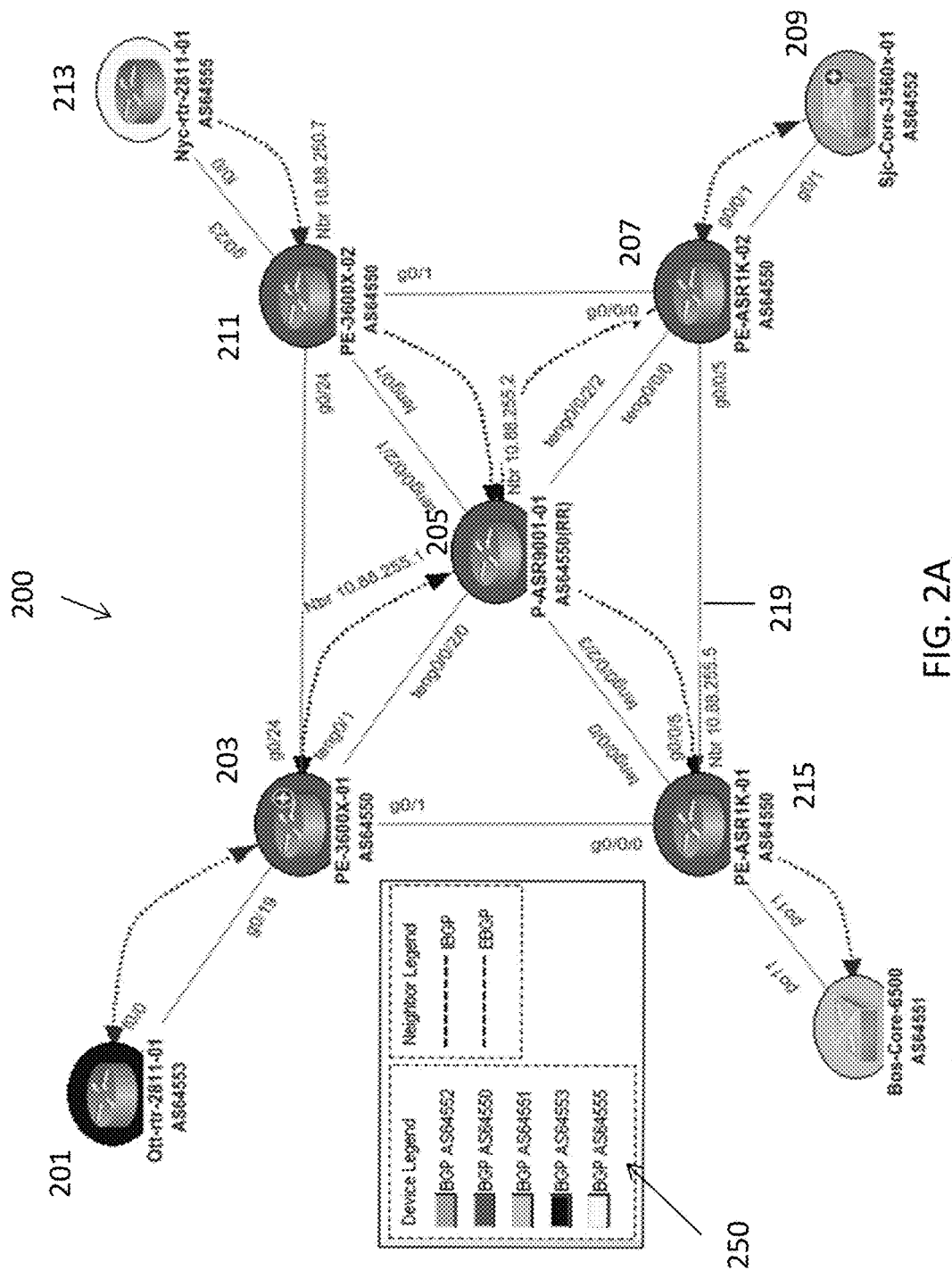
FIG. 2A shows an example Data View of a computer network Qmap indicating various relationships and running data of a live network system in accordance with this application.

In FIG. 2A, Qmap 200 is displayed under the Data View Template BGP for Border Gateway Protocol (BGP) Design. Besides the basic topology data, the BGP Data View contains BGP AS number and BGP neighbors. Also defined in the Data View is the manner how to display BGP AS number and BGP neighbors. Here the BGP AS numbers are displayed at the map position underneath the device's hostname. For example, for device 201, its BGP AS number "AS64553" is positioned below device 201's hostname "Ott-rtr-2811-01"; for device 203, its BGP AS number "AS64550" is positioned below device 203's hostname "PE-3600X-01". The same view positioning specification applies to other devices in the map as well.

Figure 2B:
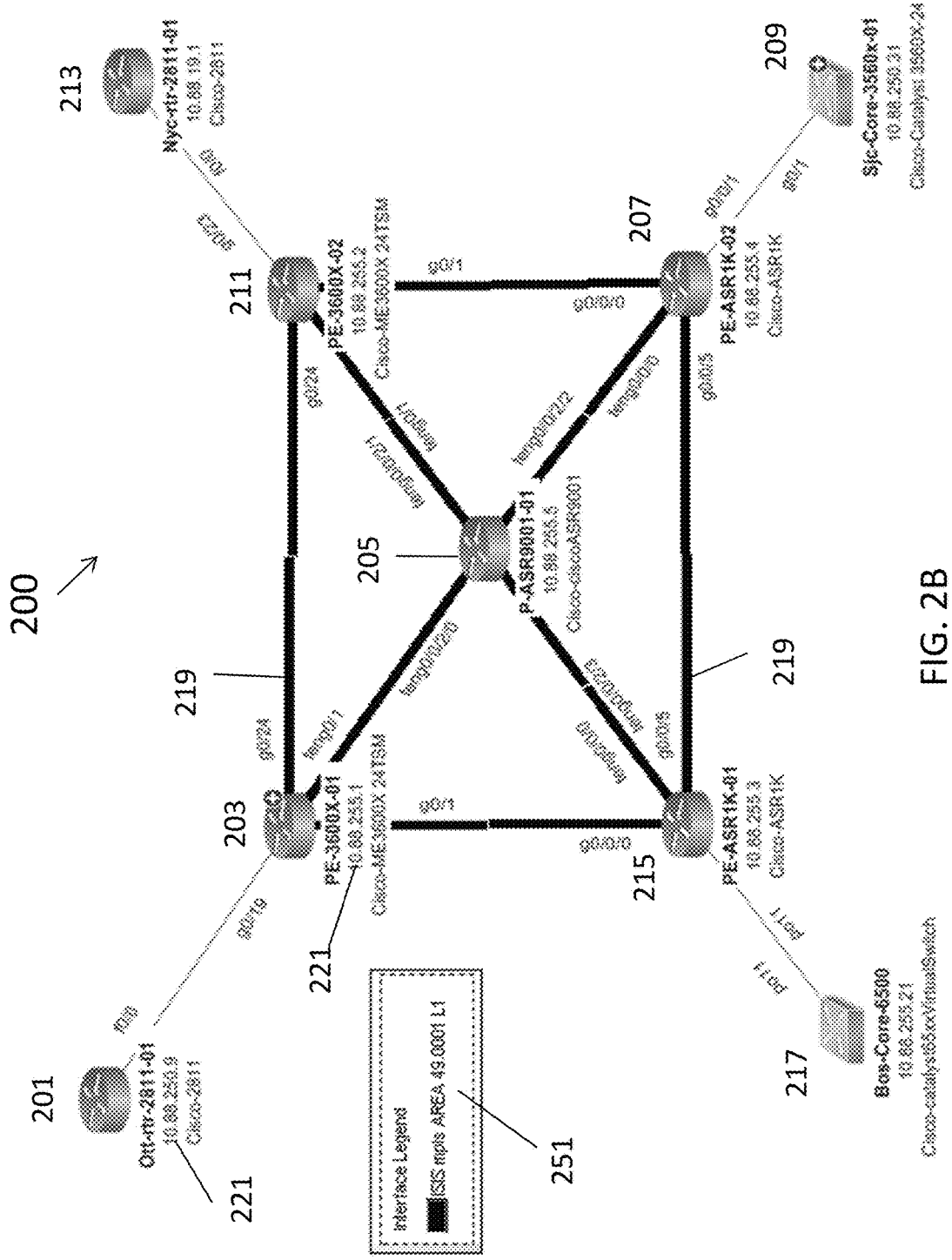
FIG. 2B shows an example of change of a Data View for the same Qmap of FIG. 2A in accordance with this application.

Users can also specify other display criteria. As shown in FIG. 2A, the devices having the same BGP AS numbers are highlighted according to the colors illustrated in the Device Legend window 250. BGP neighbors are illustrated with the dotted curves, for example, device 205 and device 207 are BGP neighbors with ID 10.88.255.2. This presentation of BGP Data View is helpful to troubleshooting BGP routing problem. However if a user is working on other types of tasks such as troubleshooting ISIS MPLS related problem, BGP Data View may not be helpful. Instead the user can define a ISIS MPLS Data View to display the ISIS related data as shown in FIG. 2B. Within the same Qmap 200, the user can switch from BGP Data View to ISIS MPLS Data View.

As shown in FIG. 2B, the dotted curve of neighbors are not displayed, instead IP routing data are displayed for each of the devices, the interface protocols are displayed. For example for device 201, 221 the IP routing data "10.88.250.9" is displayed under its hostname "Ott-rtr-2811-01," for device 203, the IP routing data "10.88.255.1" is displayed under its hos tname "PE-3600X-01." Other display criteria are also specified in this Data View, where legend window 251 defines a highlight rule for interfaces using ISIS mpls AREA 49.0001 L1, as shown in the map, for example, the interface links 219 of devices 203 and 215 are highlighted.

Figure 3:
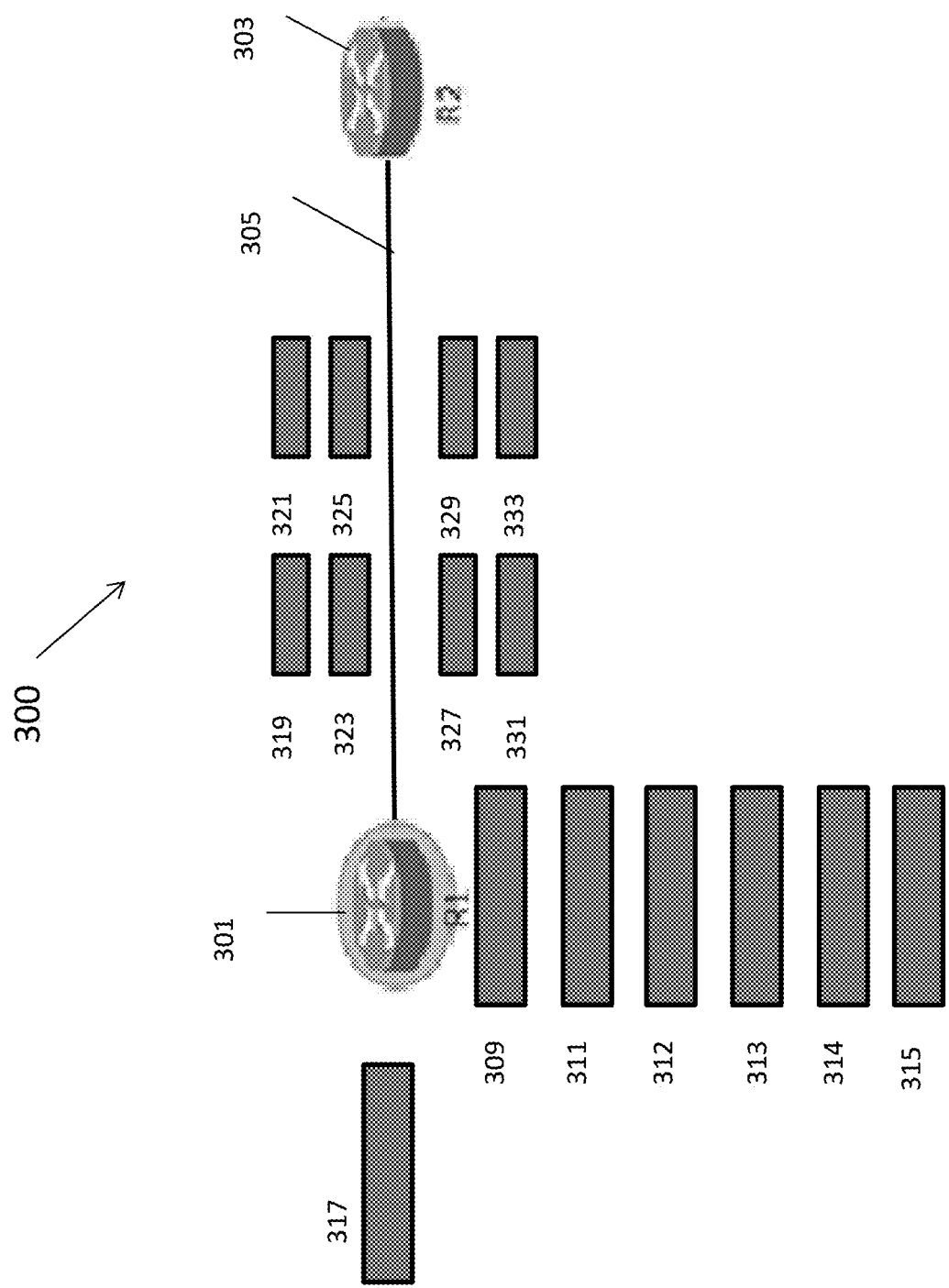
FIG. 3 schematically illustrates various positioning of Data Units in building a Data View in accordance with this application.

To create a Data View computer Object for a Device, at least a name for the Data View and a set of Data Units need to be specified. In addition to device's network data, a Data Unit also includes how to display the data in a map such as the position, color, type and editability. In general, the areas surrounding the device symbol can be divided into two main sections: the section underneath the device symbol and the section surrounding the communication link symbol. In one embodiment as illustrated in FIG. 3, the device data can be displayed in one of the 6 positions underneath the device symbol (the number of positions can be any number) and the interface data can be displayed in one of eight positions along the link symbol. Device 301 is connected to device 303 through link 305 which can be either physical links or logical links. The device data of device 301 can be displayed in the positions 309 to 315. Position 317 may be used to input a device note or comment. The interface data of device 301 can be displayed in the positions from 319 to 327. For each of the display position in this view, a Data Unit is created for this device.

There are many ways to create Data View. In one embodiment, Data View can be created from Data View Template. A user can define Data View Template from the scratch or modify the built-in Data View Templates.

Figure 4A:
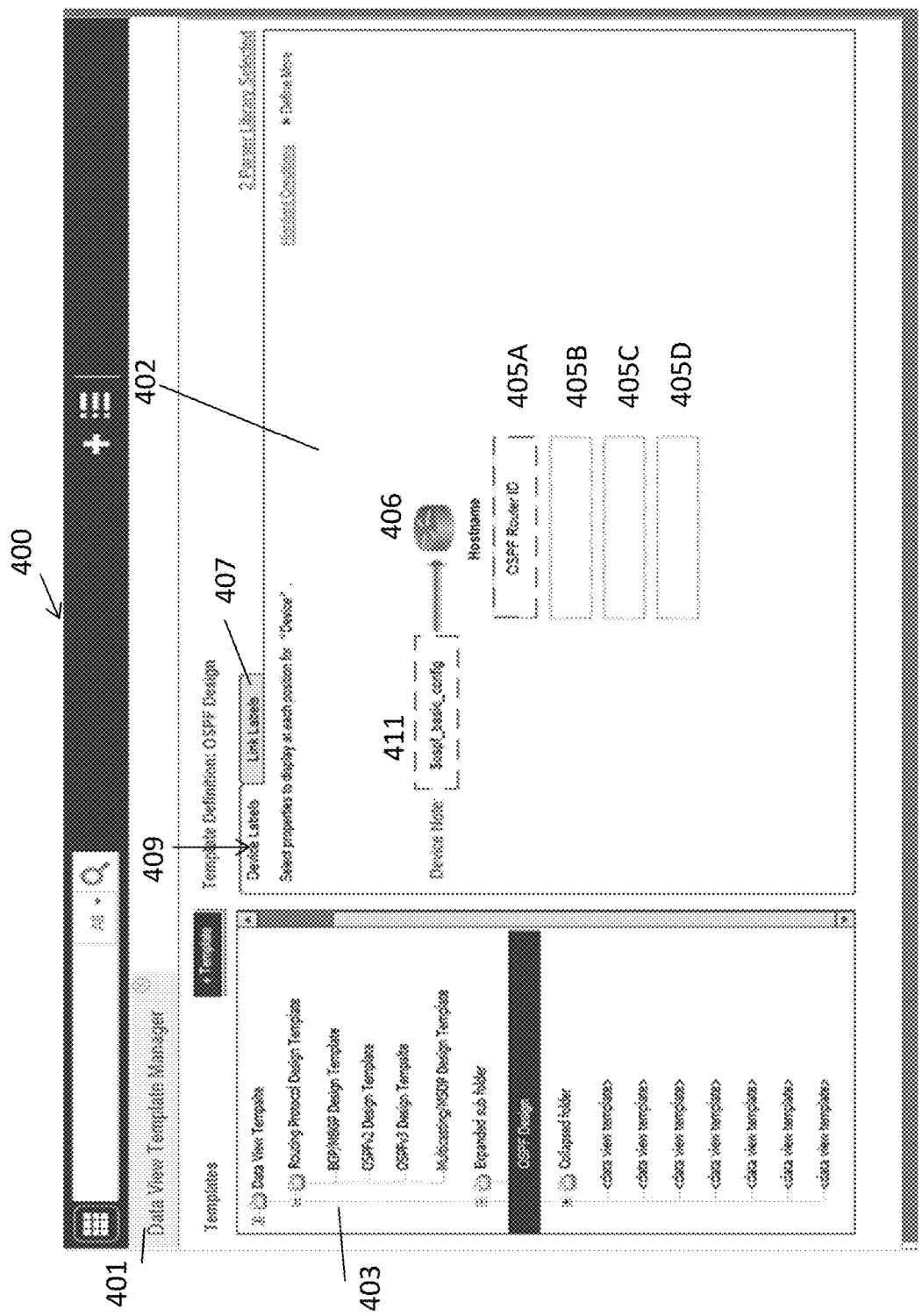
FIGS. 4A, 4B, and 4C show an example step-by-step process for designing a Data View in a Data View builder in accordance with this application.
Figure 4B:
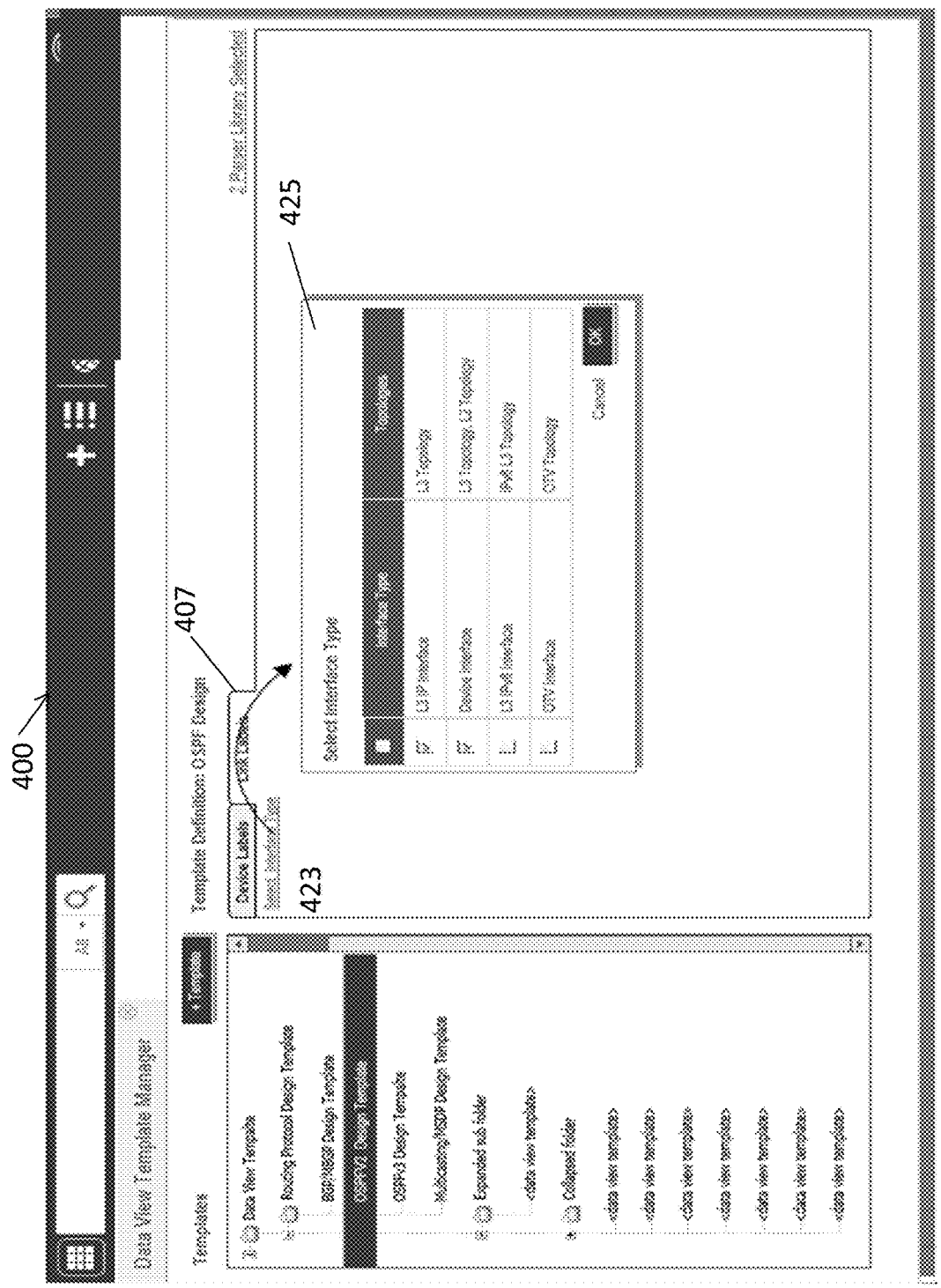
Figure 4C:
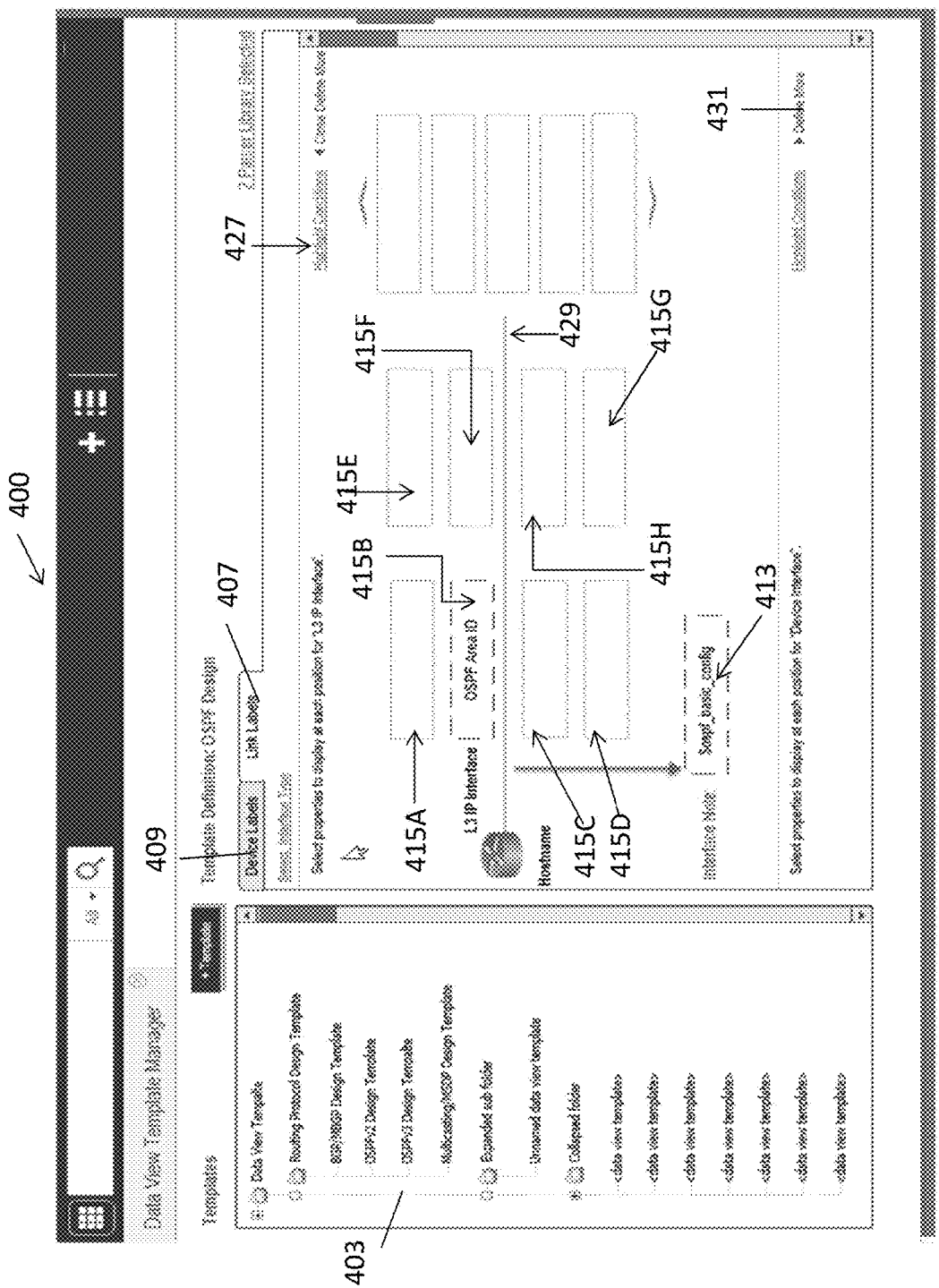

In reference to FIGS. 4A, 4B, and 4C, an example step by step data view template wizard graphic user interface 400 is shown. The Data View Manager 400 includes two-window scrollable panels. The left panel 403 displays available Data View templates while the right window panel 402 displays the positioning of data units. Right window panel 402 can include at least two tabs to define data units for the device data (i.e. tab 409) and data units for the interface data (i.e. tab 407) on a Qmap or any other network map system.

FIG. 4A shows an example of creating or editing a Data View template. With a clicking on the OSPF Design Template in left panel 403, in Device Label tab 409 a device symbol 406 is shown with at least four available positions—405A, 405B, 405C, and 405D—underneath the device symbol 406 for placing device data. Each placement of data at the position as well as the position information will be captured in a Data Unit. At each of the positions 405A, 405B, 405C, and 405D, a user can select a particular device data related to the OSPF design to be saved into a Data Unit. The particular type of the data in turn determines the Data Unit Type variable. For example, when the user selects OSPF Router ID to be displayed in the position field 405A, a Data Unit will be created which has the Data Unit Type String and will be displayed at the position just under the hostname. Similarly, the user can define a Data Unit for each of positions 405B, 405C and 405D. Besides the four positions under the device icon, the user can also define a Data Unit to be displayed in position 411 as device note. In this example the user selects the variable $ospf\_basic\_config as the device note to annotate the basic OSPF configuration of this device. In the figure, five Data Units are defined for Data View object named OSPF Design.

In reference to FIG. 4B, on clicking of tab 407, a user can specify the data units related to interface of the device. Upon clicking on Select Interface Type hyperlink 423, a pop up window 425 shows the available interface types related to OSPF Design. The different types of interfaces have different set of data. The system automatically provides a list of related choices. In the Figure, for Data View OSPF Design the user selects a L3 IP interface since OSPF is an IP routing protocol. After selecting a particular interface protocol, a user can proceed to further specify the related data fields on the map for the selected interface protocol, and the system automatically provides a list of choices for each of the data fields.

In reference to FIG. 4C, upon selecting the display interface type L3 IP interface in FIG. 4B, a link symbol 429 displays in the panel with at least 8 possible data positions 415A, 415B, 415C, 415D, 415E, 415F, 415G, 415H available for the user to create a Data Unit for each position. By clicking on a data position, a list of variables related to L3 IP Interface show, and a user can choose one to be placed at the clicked position. In FIG. 4C, the user chose to display the OSPF Area ID at position 415B which will create a Data Unit with a String Type, having the value of the OSPF Area ID and position information of 415B. Similarly the user can define data units for the other seven data field positions. The user can also define a Data Unit for holding a note for the interface at position 413. In addition, a user can specify highlight conditions by clicking on the hyperlink 427 to specify a color display rule using a Boolean expression. The variables used in the Boolean expressions may be based on device or interface properties. For example, a user may specify that the device be highlighted as RED if its CPU is running higher than 90%. At 431, the user can define more dynamic display conditions. A user can choose to display a color by creating a Logic Statement using a calculation formula. Such Logic Statement may be applied to both Device and Interface displays. Such calculation formula may take any number of and any types of variables. For example, a user can display the interface in RED if its input error>0 or its output error>0.

After all data units are defined, the Data View Template is saved, together with creation time and creator information. The named Data View Template can be then applied to any number of devices or a group of devices in a computer network map, and a Data View instance will be created for each device. Each device's Data View instance shares the name of the Data View Template. Within each Data View instance, the associated Data Units will be automatically created to capture the designated device data. The named Data View Template can also be applied to a single device and the data defined for each data fields will be displayed according to the positions specified in the Data Units.

Figure 5A:
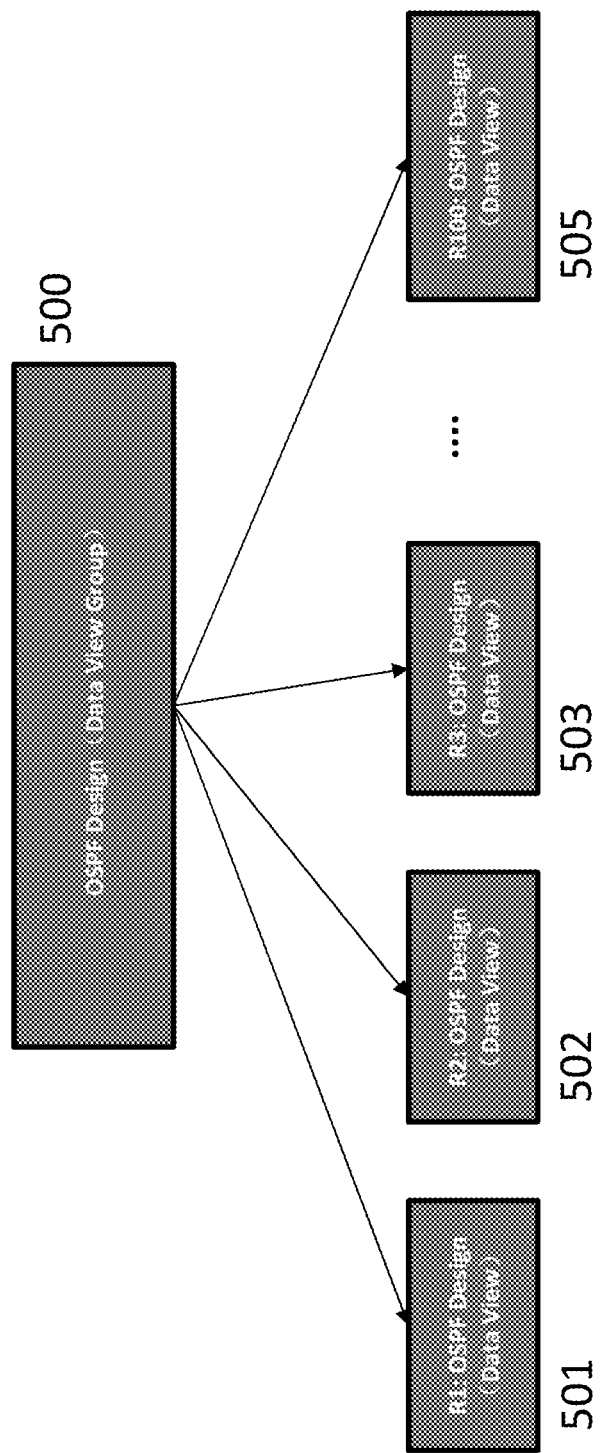
FIG. 5A shows a logic structure of an example Data View Group in accordance with this application.
Figure 5B:
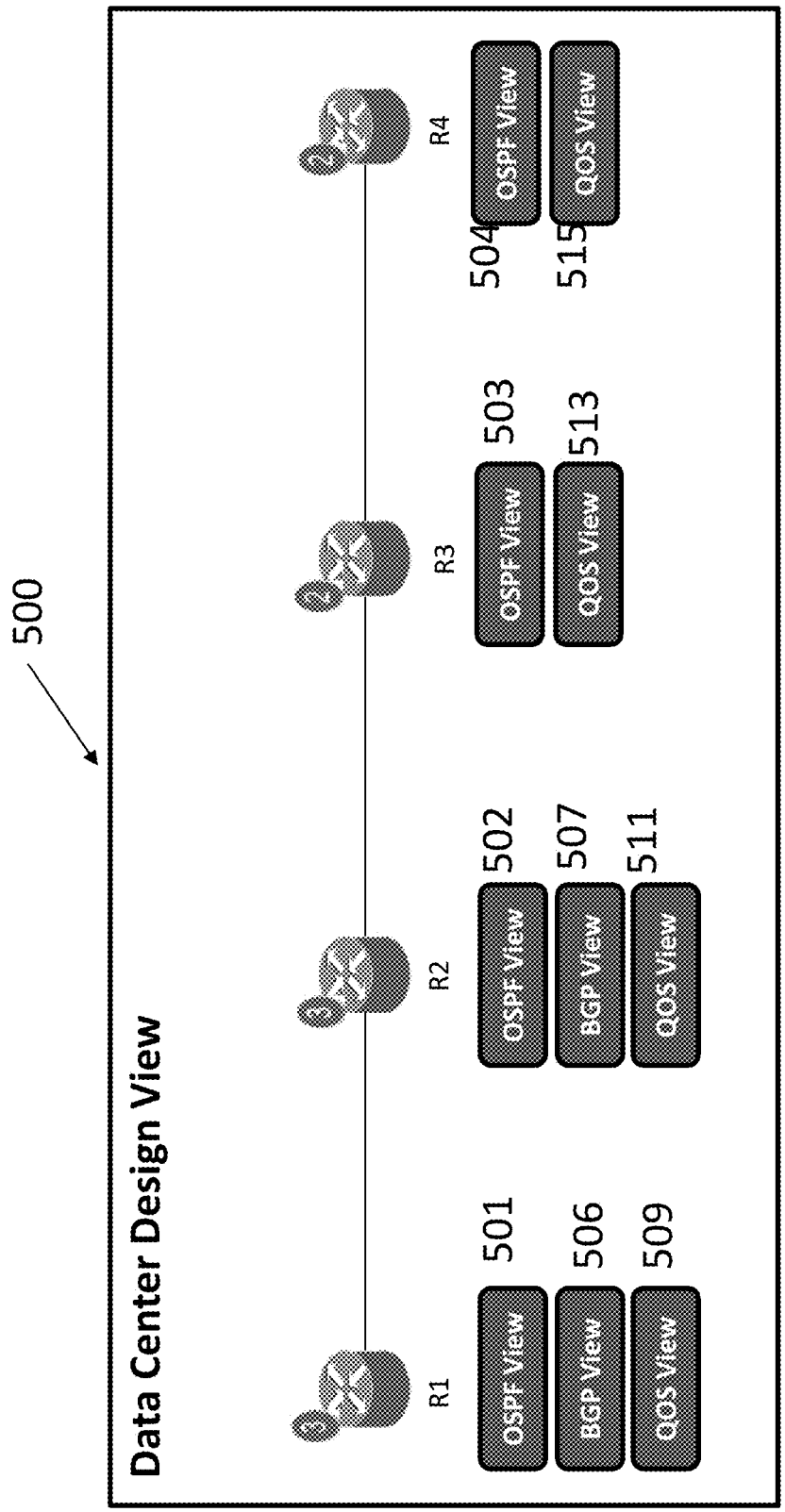
FIG. 5B shows a logic structure of an example Data View Compound in accordance with this application.

When a Data View Template is applied to a group of devices, a Data View Group is created for this group of devices. As shown in FIG. 5A, when OSPF Design Data View Template is applied to devices R1 to R100, Data View instance 501 to 505 are created for the devices respectively, the Data View instances 501 to 505 are automatically formed into OSPF Design Data View Group that takes the Data View's name. When multiple Data View Templates (e.g. OSPF view and BGP View and QOS View) are applied to a group of devices R1 to R4, as shown in FIG. 5B, the formed Data View instances 501 to 515 of all the devices under each of the templates automatically are grouped into a Data View Compound in the system for the user's easy data access.

Figure 6:
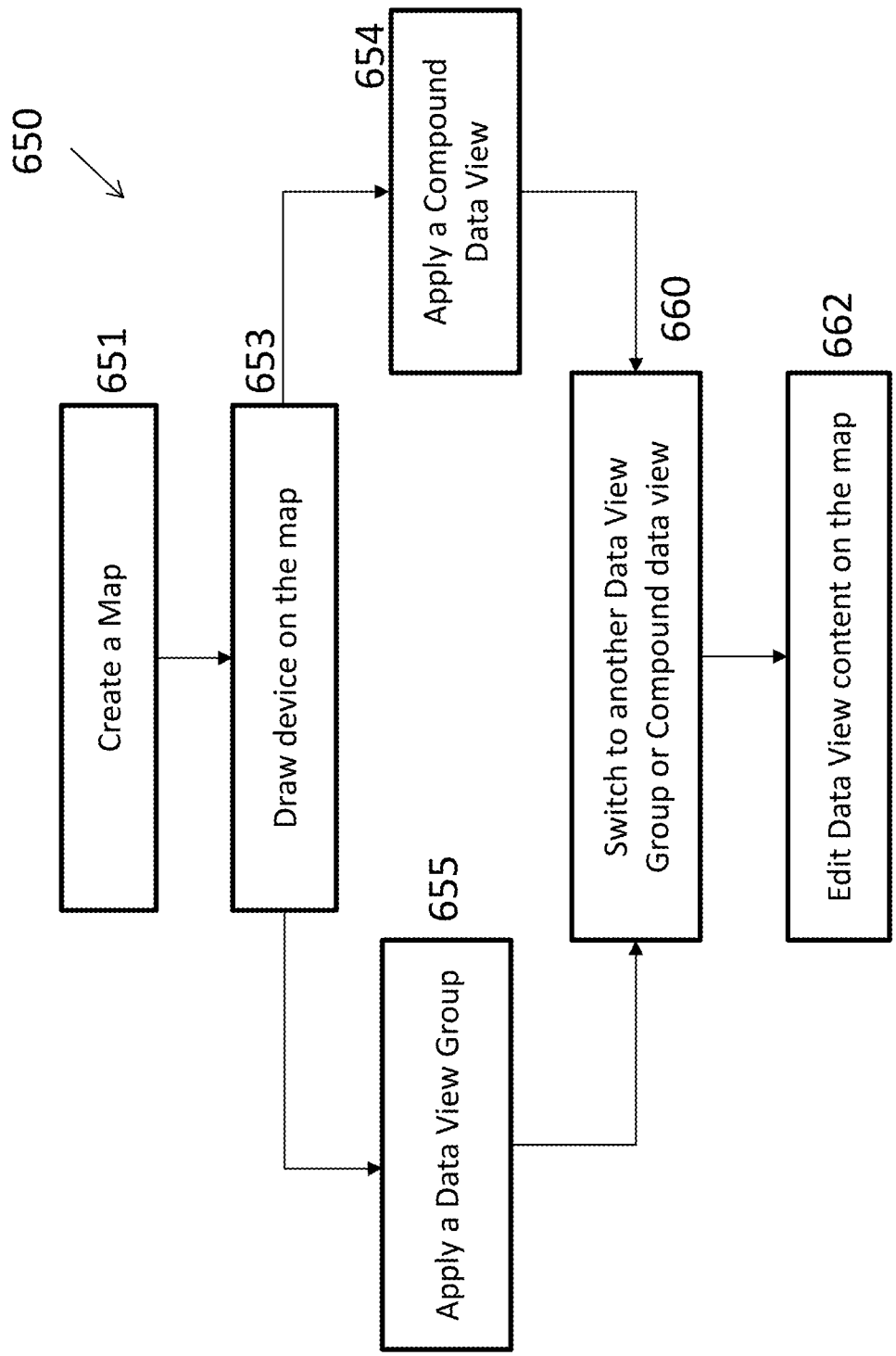
FIG. 6 shows a flow chart for populating a Data View Group or Compound with network data in accordance with this application.
Figure 7A:
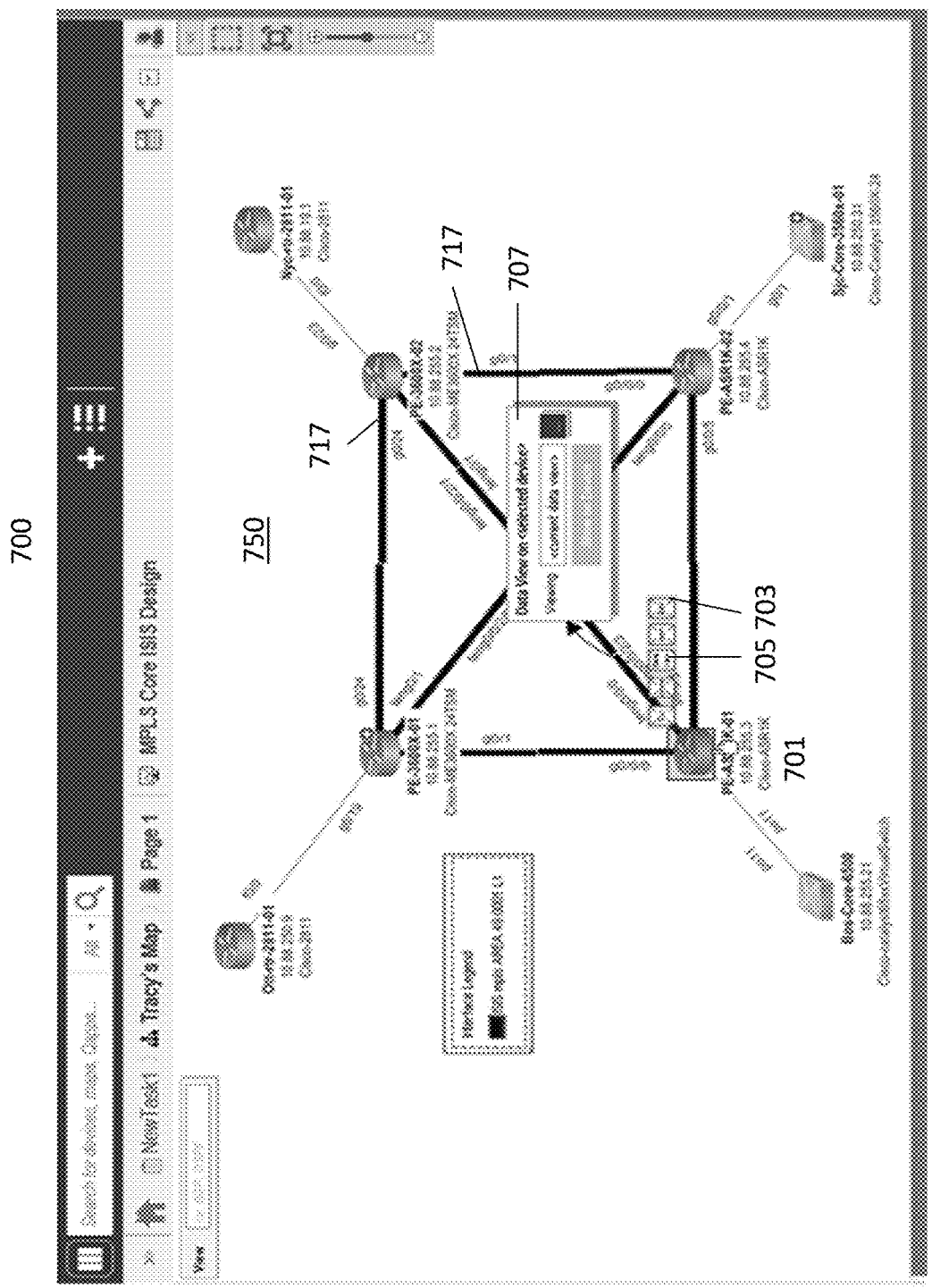
FIGS. 7A, 7B and 7C show an example toggling process for displaying different Data Views of a same Qmap in accordance with this application.

In reference to FIG. 6, flow chart 650 demonstrates the available options in this inventive system for a user to create and access network data using Data Views. To view or monitor a group of network devices, a user can first create a bare-bone map at step 651 and then draw the devices on the map at step 653. To view data, the user can then choose to either apply a Data View Group to this map at step 655 or apply a Data View Compound having multiple Data View Groups at step 654. The system also provides options to switch to other Data View Groups at step 657 or other Data View Groups within the Data View Compound at step 656. The user is further provided the option to edit the Data View directly on the map at step 662. Within a network map, a user is provided the option to directly access a device's Data View instances through the graphic elements of the map. In reference to FIG. 7A, GUI 700 for directly applying a Data View to a Device within a Qmap 750 is shown. Each device may possess a floating menu representing all of its Data View instances. Device 701 possesses a floating menu 703 having Data View buttons 705. Clicking on button 705, Data View control pane 707 pops up which lists all available Data View instances for Device 701 as shown in FIG. 7B.

Figure 7B:
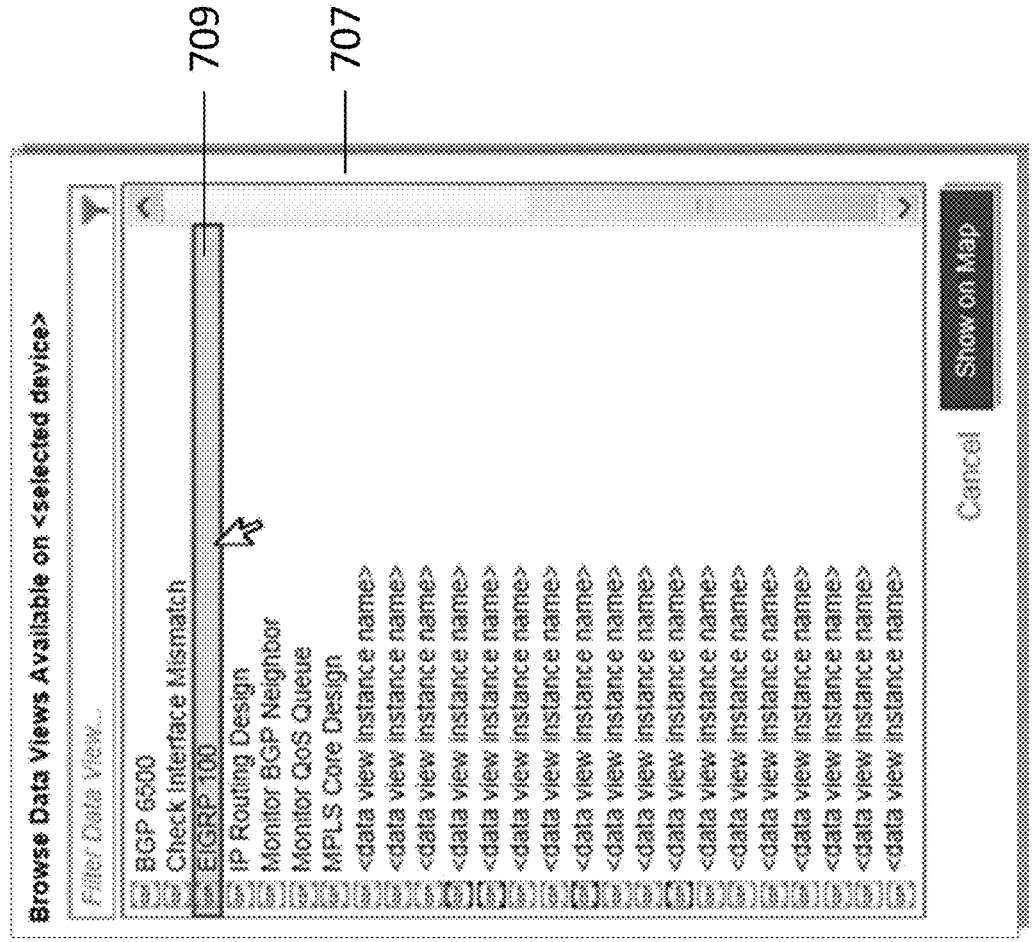
Figure 7C:
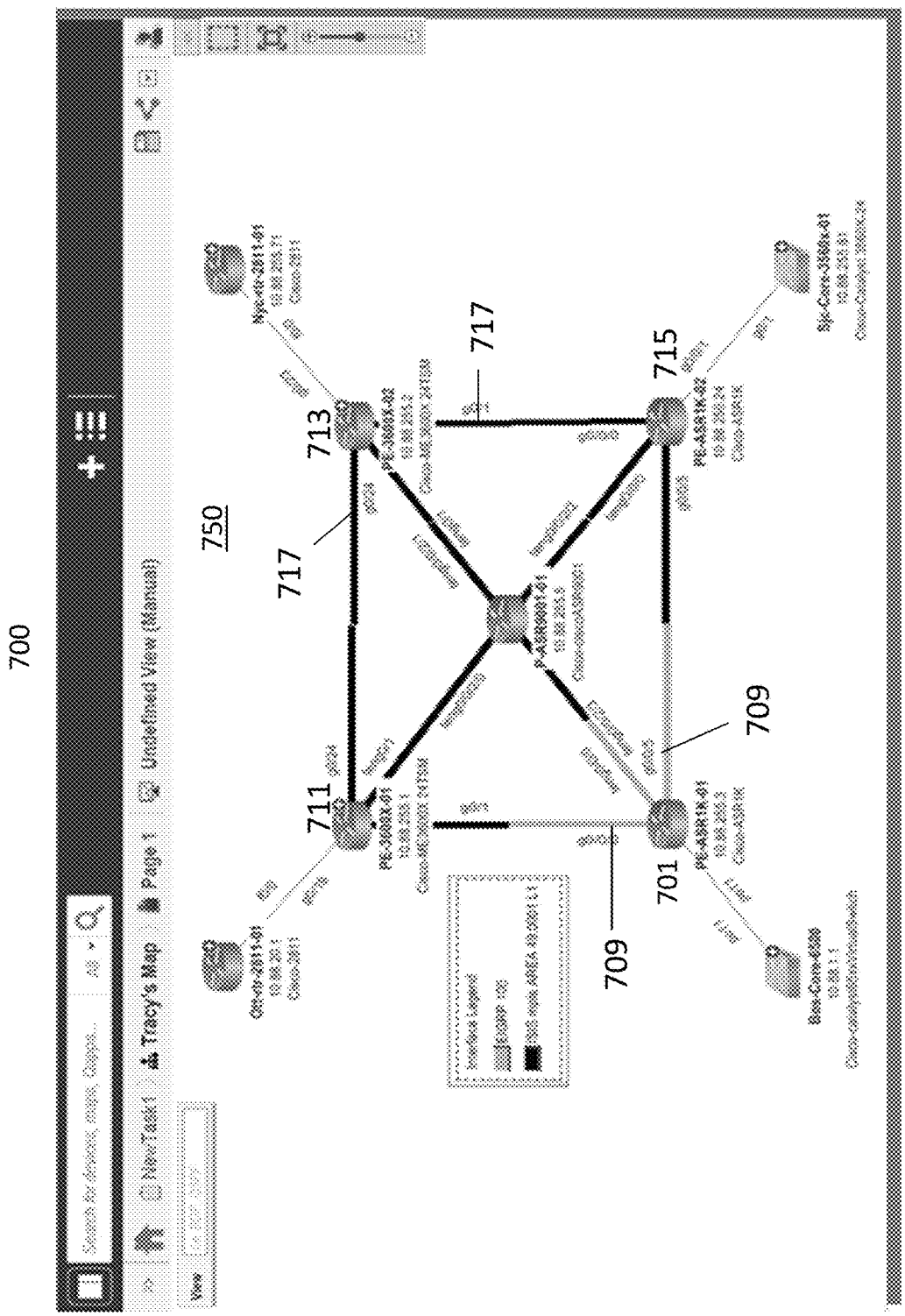

Selecting Data View EIGRP100 (709) in FIG. 7B changes the view to show the parameters of interface EIGRP 100 (709) for device 701 on Map 750 while the other devices 711, 713 and 715 still display their ISIS interfaces 717 as shown in FIG. 7C.

Figure 8A:
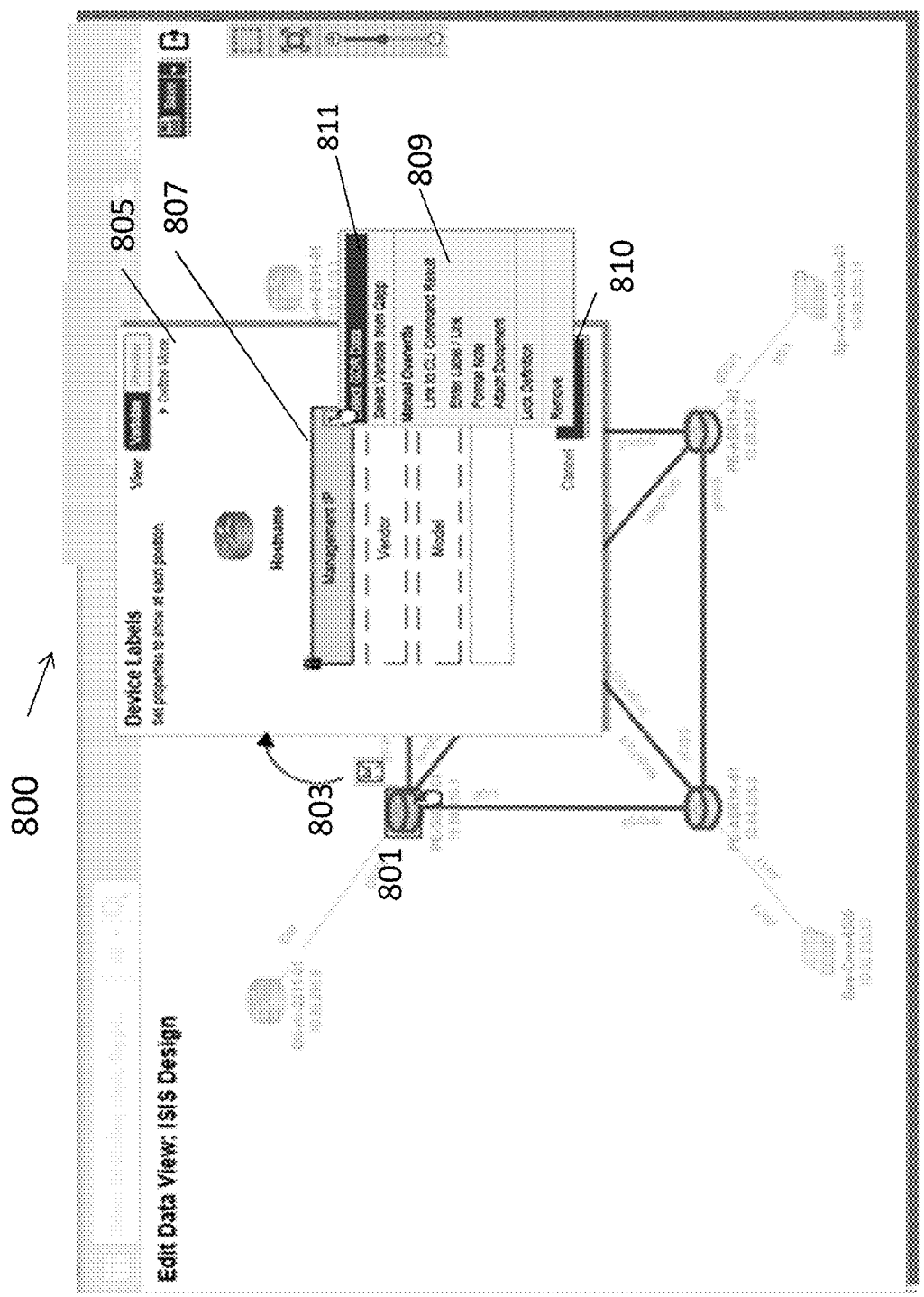
FIGS. 8A and 8B show an example Data View editing process within a Qmap in accordance with this application.

Within a network Data View bearing map, users are provided the option to directly and manually edit a Data View instance on the network map. In reference to FIG. 8A, GUI 800 for editing a Data View is shown. In the map window, device 801 possesses a floating Data View editing icon 803. Clicking on icon 803, popup window 805 shows the four positions for displaying device data. Clicking on the position labeling 807, a list panel 809 will list all the available data choices for editing. A user may select a variable from a custom-made script Qapp at 811. By clicking "Save" button 810, the changes to the current Data View of device 801 are saved.

Figure 8B:
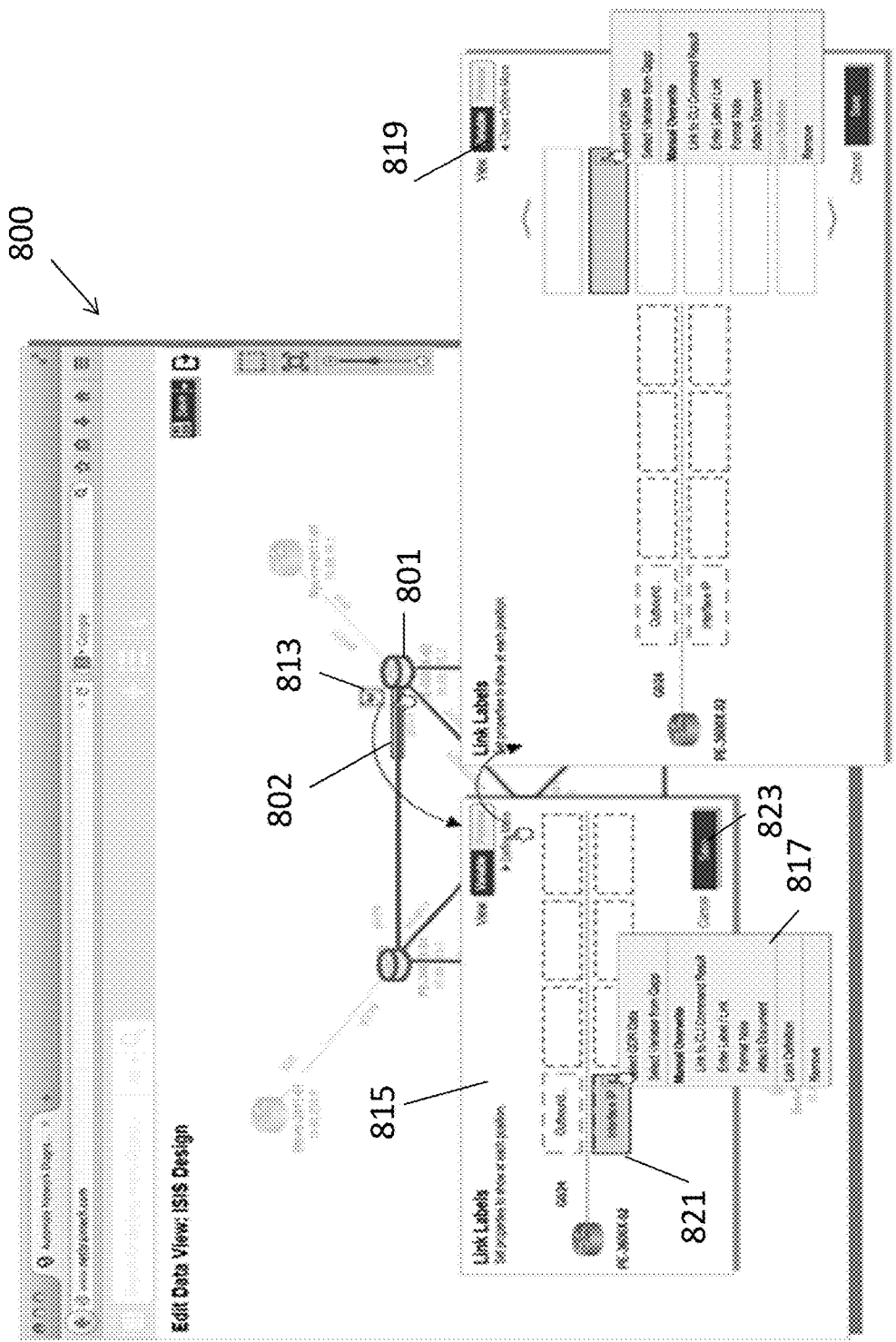

Similarly the interface data displays in the Map can also be directly and manually changed though the editing GUI 800 as shown in FIG. 8B. Interface link 802 possesses a floating Data View icon 813 that allows directly editing its Data View setting. Clicking on icon 813, popup window 815 shows the eight positions for displaying relevant interface data. Clicking on position labeling 821, for example, list panel 823 will show and list all the available data field choices for editing. A user may select a variable from a custom-made script Qapp. By clicking the "Save" button 823, the changes to the current Data View of link 802 are saved. Pop up window 819 allows for selections for other available options for display purposes.

Figure 9A:
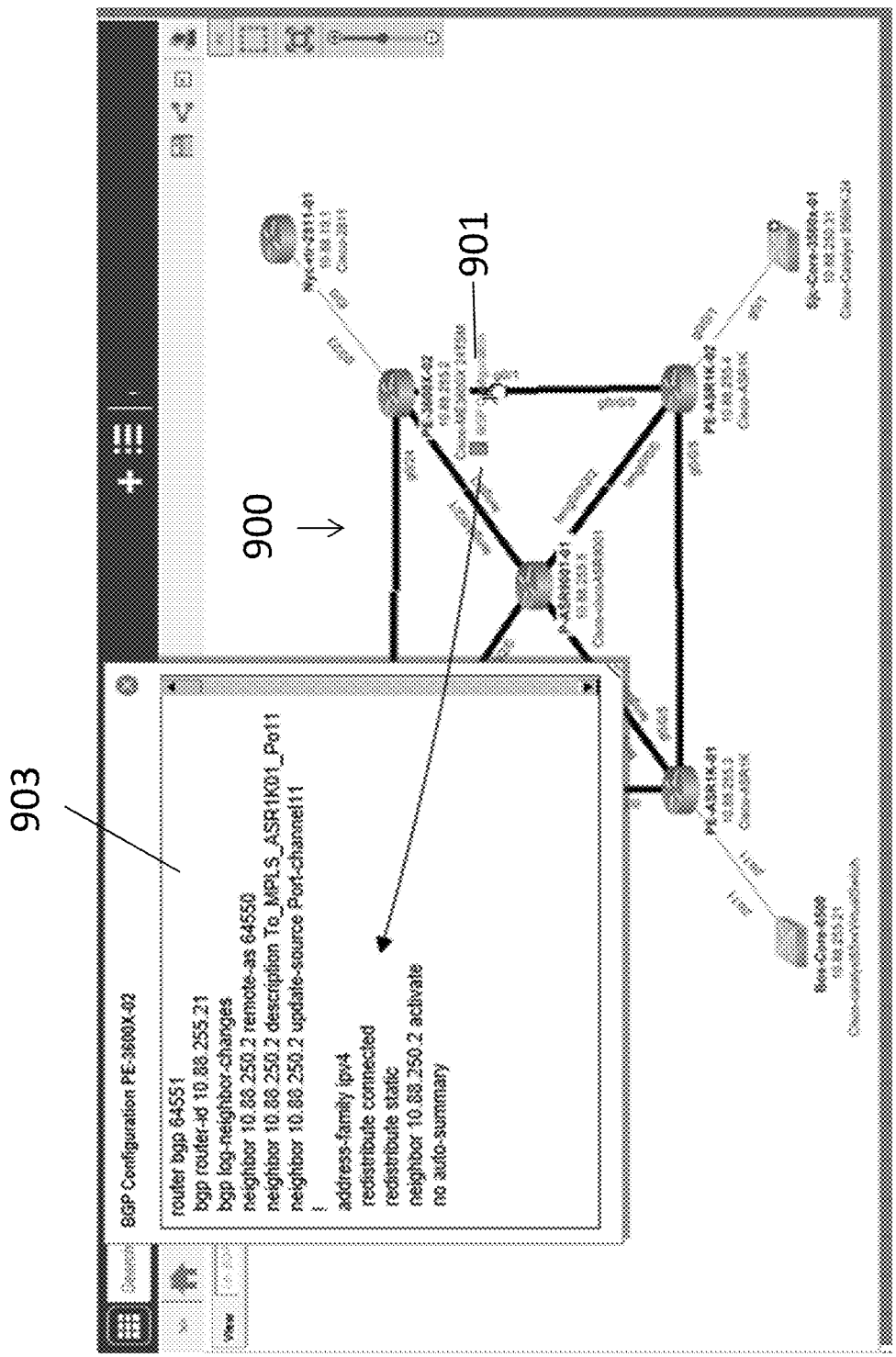
FIGS. 9A and 9B show example process of direct accessing network data via Data Views in accordance with this application.
Figure 9B:
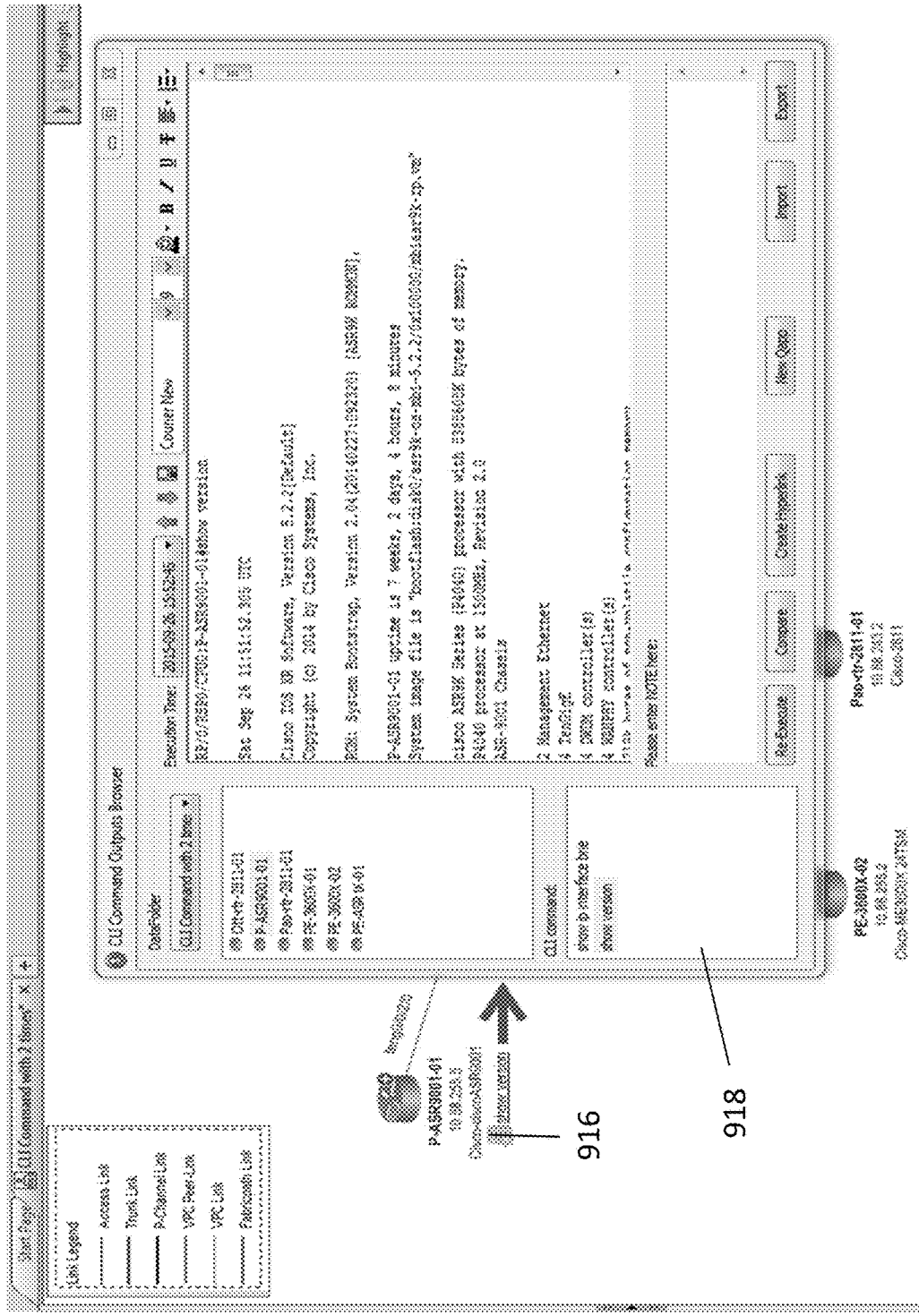

In the data view system, a user is enabled to directly access network data details through a Data View bearing network map. In reference to FIGS. 9A and 9B, example Qmap 900 is provided to show direct data content access by clicking on a data element in. A click of BGP Configuration icon 901, pop-up window 903 shows the BGP Configuration PE-3600X-02 details. In FIG. 9B, for CLI running results, and the different available versions, clicking on "Show Version" hyperlink 916, a popup window 918 displays browsable versions of CLI Command running outputs.

Figure 10A:
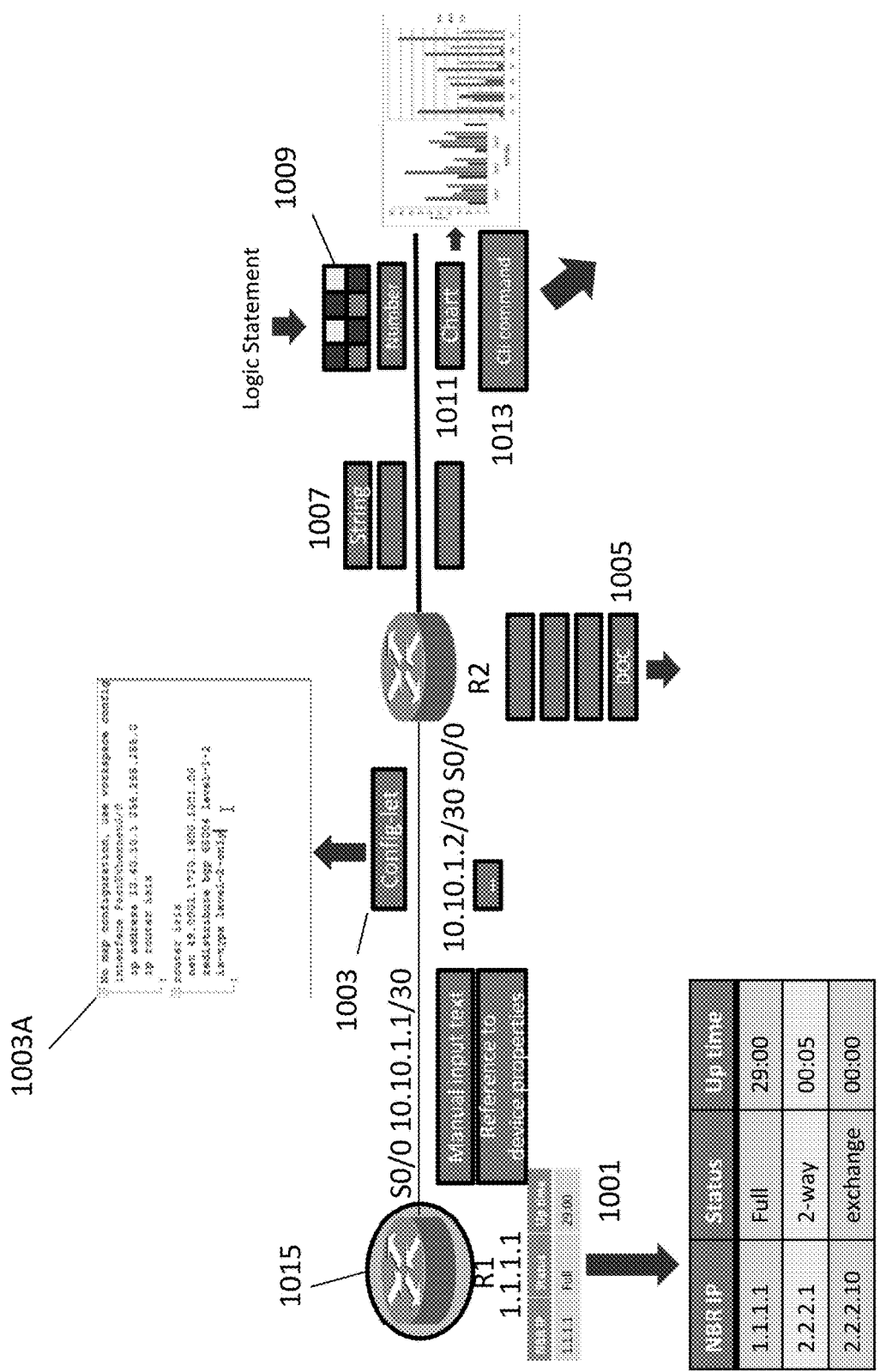
FIGS. 10A-10F show examples of automatically accessing network data through various GUI elements associated with a Data Unit Type in accordance with this application.

Not only the network data displayed on a Data View Qmap are dynamic and can be specifically tailored towards the user's tasks and needs, the accessing of data details is also dynamically accessed according to their data types. In one embodiment, different network data are defined into different categories, and each category of data is accessed with a specifically data friendly user interface. Through hyperlinking displayed data in a Data View with their categorized user interfaces, users can browse data dynamically on the same network map without any further effort. Since particular GUIs are specifically used for a particular Data Unit Type, a user can easily monitor, analyze, edit and store data with improved accuracy on the network map. FIG. 10A illustrates several of the most commonly used Data Unit Types that are accessed, viewed and made editable automatically through the associated GUI elements.

The network data that are simple short text (such as the software version and serial number) are displayed as text in a Qmap. Other types of data such as a table and chart may be too complex or too long to be accessed or viewed neatly on a Qmap. These types of data are categorized into different Data Unit Types which are associated with a particular GUI element for monitoring and editing. A user can simply click on a particular data and the data details are then automatically accessed and displayed with a pre-associated GUI of that data unit type.

Figure 10B:
Figure 10C:
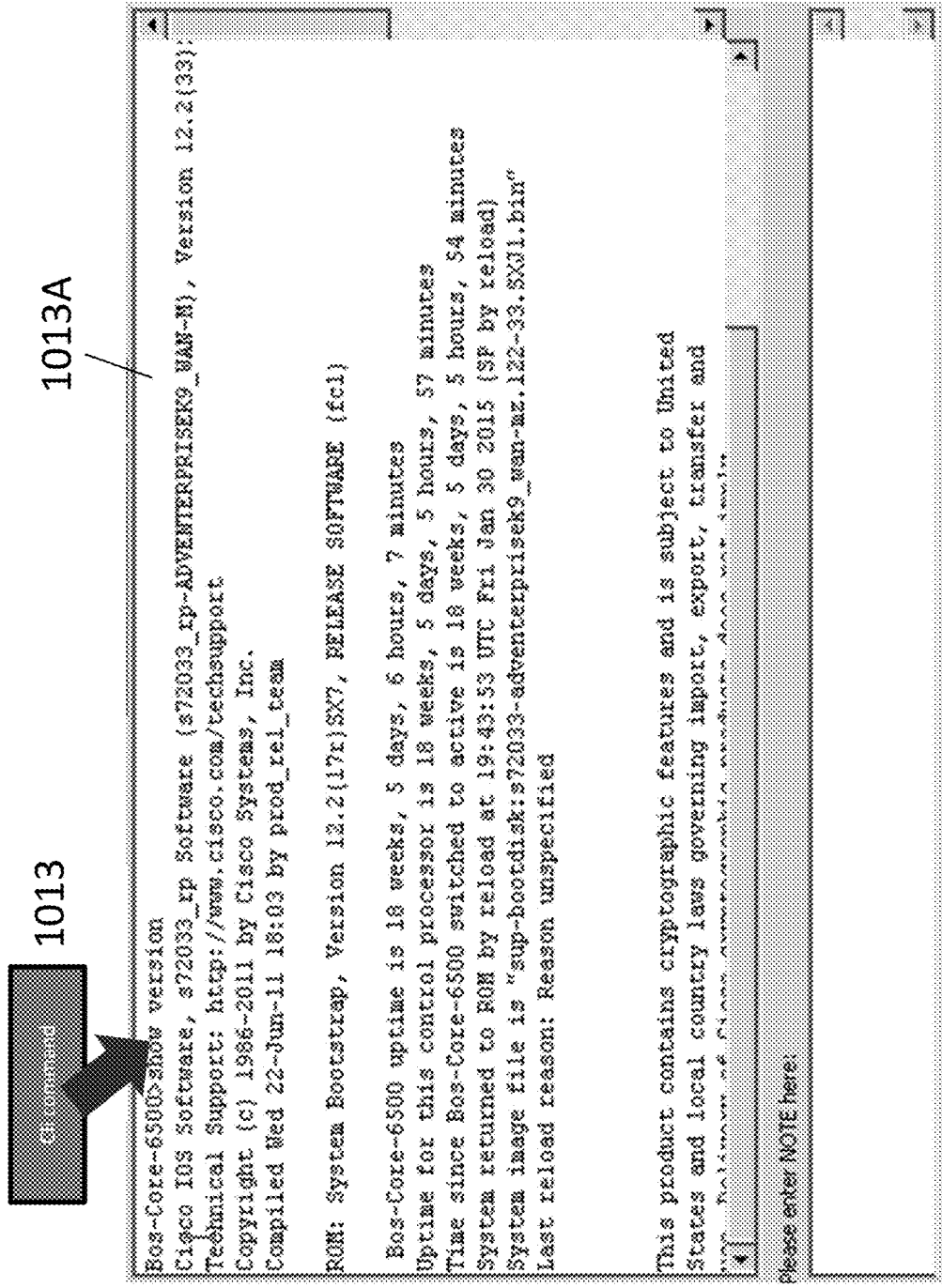
Figure 10D:
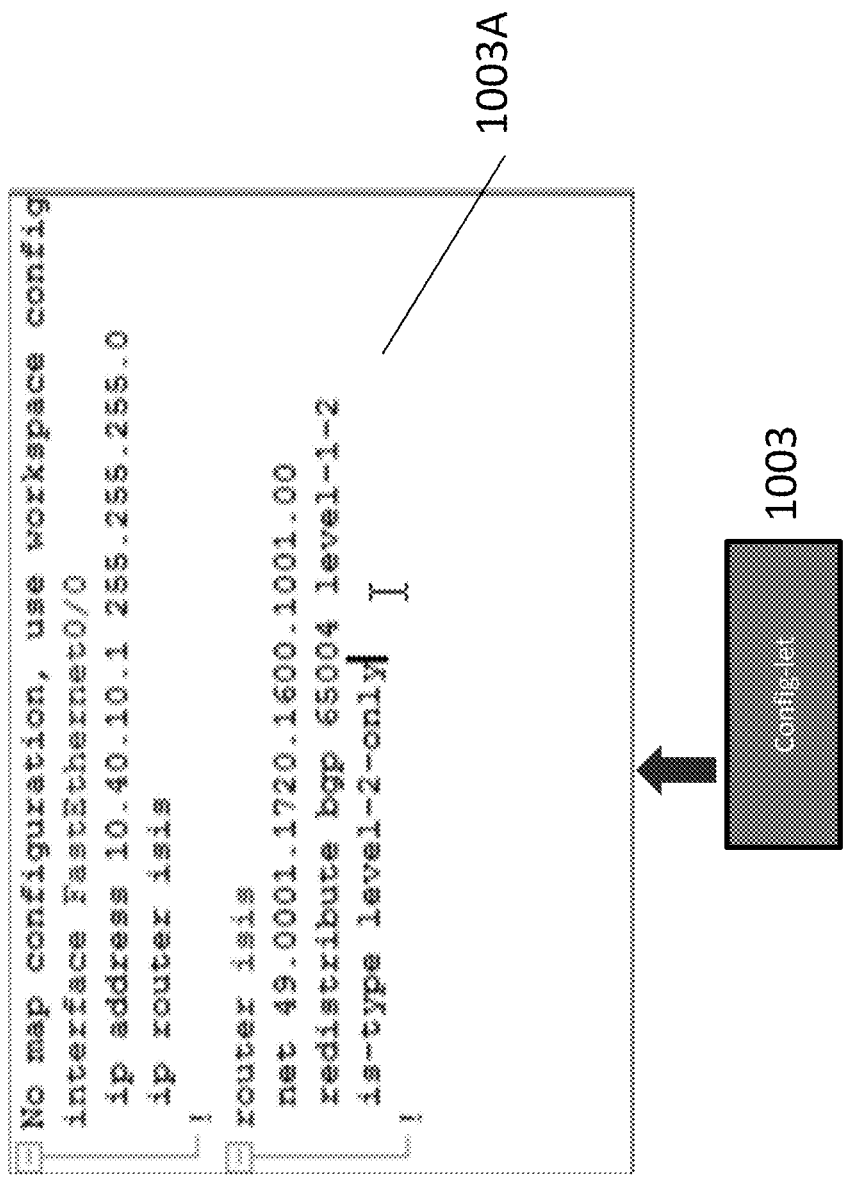

For example, Data Unit 1003 is a "Config-let" type data unit is displayed as a hyperlink. Config-let data unit allows a user to specify keywords and other parsing criteria to select only one section of the configuration file to display. Clicking on data unit 1003 results in pop-up window 1003A, which shows a short section of the configuration file (FIG. 10D). In the Config-let window, the parsing keywords may be highlighted with colors. Data unit 1005 is a hyperlinked DOC type for accessing an external document. Clicking on data unit 1005, the external document is displayed using the software associated with the file extension. For example a Microsoft Word® document is displayed by Microsoft Word® window 1005A (FIG. 10B). A PDF file would be viewed with a PDF reader installed on the user's computer system.

Figure 10E:
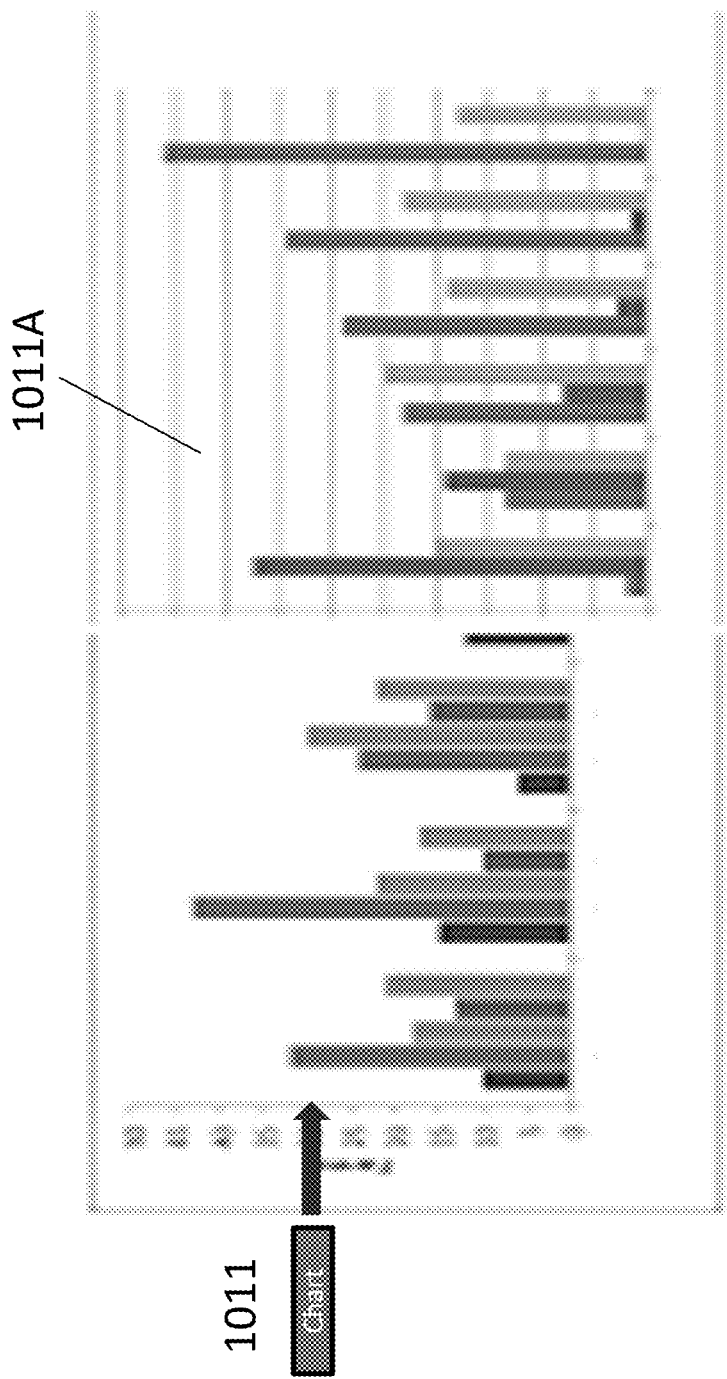

Dynamic data may be accessed using Chart Data Type. Comparisons and data change over time are best viewed through graphs and bars with X and Y axis. Chart type data unit 1011 may be displayed as the chart icon in a network map. Clicking the chart icon results in displaying the specified dynamic monitoring data in various charts 1011A (FIG. 10E).

Figure 10F:
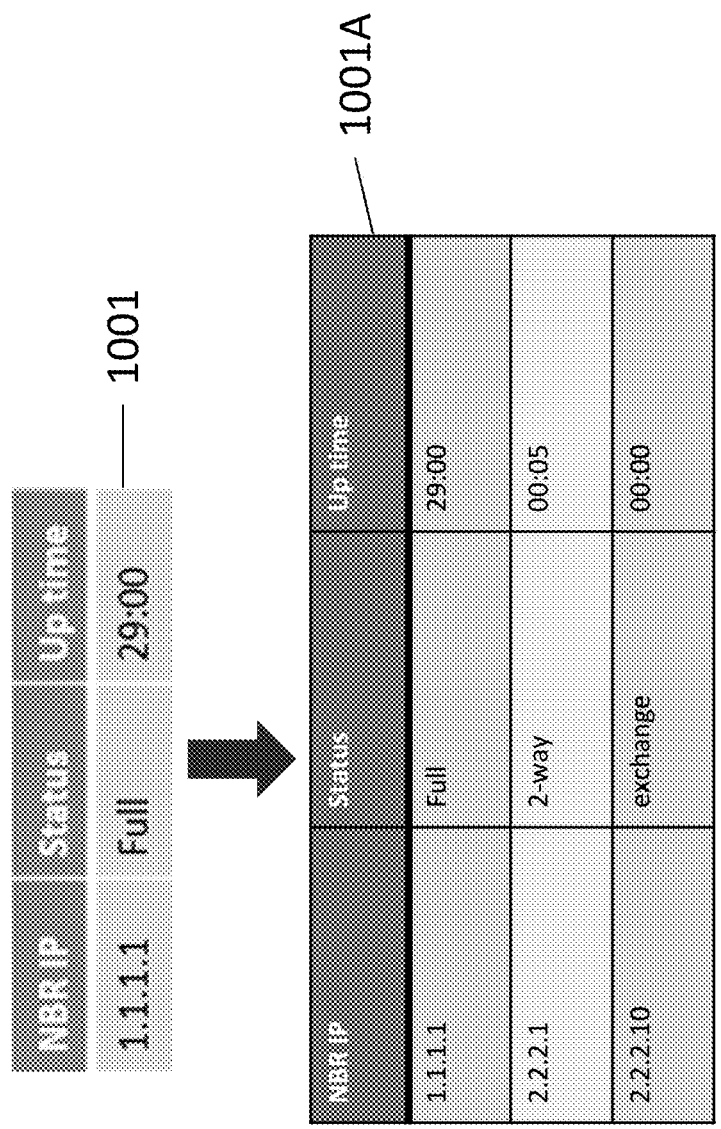

The execution result from running a network CLI command may be accessed with a "CLI command" Data Unit. Data unit 1007 is hyperlinked with a window that shows the running result from execution of a particular CLI command. As shown in FIG. 10C clicking "CLI command" hyperlink label brings up window 1013A that shows the execution result of a particular network CLI command specified by the user. The CLI command results can be editable. Device Note type data unit 1015 may be displayed by a hovering-over popup window. For the table data unit 1001, the table header and the first entry are displayed. Click the first entry results and the full table is displayed as shown in FIG. 10F. Data unit 1009 indicates a Logic Statement, clicking on brings up a window for displaying the defined logic statement for this Data View. The hyperlinks of the data units are automatically linked to the Data Unit Type with the tailored specific user interface allows a user As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle. The claims as filed are intended to be as comprehensive as possible, and NO subject matter is intentionally relinquished, dedicated, or abandoned.

What is claimed is:

1. A system for managing and displaying computer network data of a computer network, the method comprising:
    a plurality of computer processors for running and executing a set of computer component modules, said set of computer component modules comprising:
        a set of the computer network data comprising information of at least one of: a device, an interface and a topology of the computer network;

a plurality of Data Unit components, each Data Unit component containing a particular section of said set of computer network data, wherein each individual Data Unit component respectively includes a positioning element that stores a displaying indication for image-display of said particular section of said set of computer network data in a computer network GUI presented on a display; and a plurality of Data View components, each Data View component containing a particular subset of said plurality of Data Unit components, whereby a user is able to view a subset of the set of computer network data by displaying a Data View component in the computer network GUI presented on the display, wherein the displaying indication in the Data Unit component positioning element defines where the computer network data will be displayed relative to a symbol presented on the display, wherein the displayed symbol is one of a device symbol corresponding to a device in the computer network and a link symbol corresponding to a link between devices in the computer network, and wherein the displaying indication identifies one of a plurality of locations below the device symbol or one of a plurality of locations along the link symbol.

2. The system of claim 1, wherein said plurality of Data View components are created by applying a Data View Template to a group of devices shown in a network Map corresponding to the computer network.

3. The system of claim 2, wherein said Data View Template is created through a Data View system wherein said individual positioning element for each individual Data Unit component is specified by a visual graphic means.

4. The system of claim 1, wherein said computer network GUI is a Qmap.

5. The system of claim 1, wherein each individual Data Unit component is categorized into a Data Unit Type that is selected from a group comprising a Config-let Type, a Table Type, a Hyperlink Type, a DOC Type, a CLI-command Type, a String Type, a Note Type, a Change Event Type, a Chart Type, and a Paragraph Type.

6. The system of claim 1, wherein at least one of said plurality of Data View components further contains a Highlight Rule component for specifying a color display rule using a Boolean expression.

7. The system of claim 1, wherein at least one of said plurality of Data View components further contains a Device Note component or an Interface Note component.

8. The system of claim 1, wherein at least one of said plurality of Data View components further contains a Logic Statement for specifying a display condition using a calculation formula.

9. The system of claim 1, wherein said plurality of Data View components is created by applying at least two Data View Templates to multiple groups of devices shown in a network Map corresponding to the computer network.

10. A method of managing computer network data of a computer network using a GUI system, the method comprising the steps of:

providing a plurality of computer processors for running and executing the steps of:

creating at least one Data View Template component in a GUI wherein said at least one Data View Template comprises a plurality of display-positions for image-displaying a plurality of computer network parameters of the computer network;

creating a plurality of Data Unit components, each Data Unit component containing one of said plurality of computer network parameters and one of said plurality of display-positions, said plurality of Data Unit components being encapsulated inside said at least one Data View Template component;

applying said at least one Data View Template to a computer network Map corresponding to the computer network; and creating a plurality of Data View components using said at least one Data View Template, wherein each Data View component includes a plurality of Data Unit components containing network parameters from an individual device in said computer network Map, wherein the display-position in the Data Unit component defines where the computer network parameters will be displayed relative to a symbol presented on the display, wherein the displayed symbol is one of a device symbol corresponding to a device in the computer network and a link symbol corresponding to a link between devices in the computer network, and wherein the display-position identifies one of a plurality of locations below the device symbol or one of a plurality of locations along the link symbol.

11. The method of claim 10, further comprising the step of categorizing each individual Data Unit component into a Data Unit Type selected from a group comprising a Config-let Type, a Table Type, a Hyperlink Type, a DOC Type, a CLI-command Type, a String Type, a Note Type, a Change Event Type, a Chart Type, and a Paragraph Type.

12. The method of claim 11, further comprising the step of designating a particular GUI for a Data Unit Type to access and display computer network data detail contained in a Data Unit component.

13. The method of claim 10, wherein said at least one Data View Template further comprises a Highlight Rule component for specifying a color display rule using a Boolean expression.

14. The method of claim 10, wherein said at least one Data View Template component further comprises a Device Note component or an Interface Note component for accepting comments from a user.

15. The method of claim 10, wherein said at least one Data View Template further comprises a Logic Statement for specifying a display condition using a calculation formula.

16. The method of claim 10, further comprising:

creating the plurality of Data View components by using at least two Data View Templates to manage network data from a plurality of Devices wherein each individual Data View component encapsulates an individual Device, and said plurality of Data View components form a Data View Compound.

17. A method for managing computer network data of a computer network using a GUI system, comprising the steps of:

providing a plurality of computer processors for running and executing the steps of:

inputting a set of the computer network data comprising information of at least one of: a device, an interface and a topology of the computer network, into a set of Data Unit components, each individual Data Unit component containing a particular section of said set of computer network data, wherein each individual Data Unit component respectively includes a positioning element that stores a displaying indication for image-display of said particular section of the set of computer network data in a computer network GUI presented on a display;

creating a plurality of Data View components, each Data View component containing a particular subset of said plurality of Data Unit components; and displaying a Data View component in a computer network map presented on the display, whereby a user can view the subset of network data contained in the particular subset of Data Unit components, wherein the displaying indication in the Data Unit component positioning element defines where the computer network data will be displayed relative to a symbol presented on the display, wherein the displayed symbol is one of a device symbol corresponding to a device in the computer network and a link symbol corresponding to a link between devices in the computer network, and wherein the displaying indication identifies one of a plurality of locations below the device symbol or one of a plurality of locations along the link symbol.

18. The method of claim 17, wherein said computer network map is a Qmap.

19. The method of claim 18, further comprising the step of editing the set of Data Unit components through clicking a GUI element on said Qmap.

20. The method of claim 19, further comprising the step of switching to another Data View component through clicking on the GUI element on said Qmap.

\* \* \* \* \*